United States Patent
Chen

(10) Patent No.: US 11,927,488 B2
(45) Date of Patent: Mar. 12, 2024

(54) THERMAL DETECTION SYSTEM CAPABLE OF PROVIDING EARLY WARNING AND RELATED PRODUCTS

(71) Applicant: Chia-Ling Chen, New Taipei (TW)

(72) Inventor: Chia-Ling Chen, New Taipei (TW)

( * ) Notice: Subject to any disclaimer, the term of this patent is extended or adjusted under 35 U.S.C. 154(b) by 488 days.

(21) Appl. No.: 16/714,332

(22) Filed: Dec. 13, 2019

(65) Prior Publication Data
US 2020/0217723 A1 Jul. 9, 2020

Related U.S. Application Data

(60) Provisional application No. 62/788,008, filed on Jan. 3, 2019.

(51) Int. Cl.
*G01K 1/143* (2021.01)
*G06F 1/20* (2006.01)
*H02J 7/00* (2006.01)

(52) U.S. Cl.
CPC .............. *G01K 1/143* (2013.01); *G06F 1/206* (2013.01); *H02J 7/00309* (2020.01)

(58) Field of Classification Search
CPC ........ G01K 1/143; G01K 13/00; G01K 11/32; G01K 7/02; G01K 17/00; G01K 9/00;
(Continued)

(56) References Cited

U.S. PATENT DOCUMENTS 5,133,605 A * 7/1992 Nakamura ........... G08B 13/194
 374/129
6,630,655 B2 * 10/2003 Fukunaga ............ H05B 6/6455
 374/149
(Continued)

FOREIGN PATENT DOCUMENTS

CN 1755741 A 4/2006
CN 1825075 A 8/2006
(Continued)

OTHER PUBLICATIONS 11-202816714332_2023-11-08_JP_2018173888_A_H.pdf.*
(Continued)

*Primary Examiner* — Gail Kaplan Verbitsky
(74) *Attorney, Agent, or Firm* — WPAT, P.C.; Anthony King

(57) ABSTRACT

A thermal detection system is provided. The thermal detection system includes a thermal detector, an area indicating unit and a control unit. The thermal detector includes a thermal sensor array. The thermal detector is configured to detect thermal radiation within a detection area around the thermal detector. The detection area is defined by a field of view of the thermal sensor array. The area indicating unit is arranged to indicate a human-perceptible area according to the detection area. The human-perceptible area is located within the detection area and indicates a geometric form of the detection area. The control unit, coupled to the thermal detector and the area indicating unit, is configured to generate a thermal detection result according to the detected thermal radiation. The thermal detection system further includes a notification unit for overheat indication, a communication unit for wireless signal transmission, and a protection unit for overheat protection.

20 Claims, 17 Drawing Sheets

(58) Field of Classification Search
CPC .. G01K 2213/00; H02J 7/00309; G06F 1/206; G01J 5/00; G01J 5/02; G01B 11/14
USPC .............. 374/121; 250/338.1; 356/43, 44
See application file for complete search history.

(56) References Cited

U.S. PATENT DOCUMENTS

| | | | | |
|---|---|---|---|---|
| 7,239,974 | B2 * | 7/2007 | Gulati | G01J 5/0003 73/76 |
| 7,339,685 | B2 * | 3/2008 | Carlson | G01J 5/0896 356/614 |
| 7,667,690 | B2 * | 2/2010 | Lee | G06F 3/0317 345/157 |
| 8,374,438 | B1 * | 2/2013 | Wagner | H04N 5/33 382/209 |
| 8,577,120 | B1 * | 11/2013 | Koshti | G06T 7/0004 250/341.8 |
| 10,371,577 | B2 * | 8/2019 | Jeon | G01J 5/0896 |
| 2004/0124359 | A1 | 7/2004 | Hamrelius et al. | |
| 2005/0279940 | A1 | 12/2005 | Everest | |
| 2008/0212641 | A1 * | 9/2008 | Hamann | H01L 23/34 374/E17.008 |
| 2009/0065695 | A1 * | 3/2009 | DeMarco | G01J 5/07 250/342 |
| 2009/0238238 | A1 * | 9/2009 | Hollander | G01J 5/0806 250/340 |
| 2010/0179785 | A1 * | 7/2010 | Jensen | G01J 5/026 702/135 |
| 2011/0297829 | A1 * | 12/2011 | Altmann | G01N 25/00 250/340 |

FOREIGN PATENT DOCUMENTS

| | | | | |
|---|---|---|---|---|
| CN | 101786408 | A | | 7/2010 |
| CN | 202034125 | U | | 11/2011 |
| CN | 103930180 | A * | 7/2014 | ............ A63F 13/06 |
| CN | 203932535 | U | | 11/2014 |
| CN | 104808082 | A | | 7/2015 |
| CN | 106787177 | A * | 5/2017 | |
| CN | 206712156 | U | | 12/2017 |
| CN | 107765162 | A | | 3/2018 |
| CN | 207070162 | U | | 3/2018 |
| CN | 208109265 | U | | 11/2018 |
| GB | 2327493 | A | | 1/1999 |
| JP | H06230294 | A * | 6/1994 | |
| JP | 2004260527 | A * | 9/2004 | |
| JP | 2009181670 | A * | 8/2009 | |
| JP | 2018173888 | A * | 11/2018 | |
| TW | 201715211 | A | | 5/2017 |
| TW | 201826659 | A | | 7/2018 |
| TW | 224906 | | | 10/2023 |
| WO | WO-2008154005 | A1 * | 12/2008 | ........... A61B 18/201 |
| WO | WO-2012115881 | A1 * | 8/2012 | ............... G06T 7/00 |

OTHER PUBLICATIONS

Office Action, Cited References and Search Report dated Jan. 20, 2021 issued by China National Intellectual Property Administration for Counterpart Application No. 202010001129.X.
English Abstract of CN202034125U.
Office Action, Cited References and Search Report dated Dec. 28, 2021 issued by the China National Intellectual Property Administration for the Chinese counterpart application No. 202010001129.X.
English Abstract of CN1755741A, CN203932535U, CN206712156U, CN207070162U, CN107765162A and CN104808082A.
Office Action dated Jun. 7, 2023 by TIPO of Taiwan for corresponding application 108148693.
English abstract translation of CN208109265U.
English abstract translation of TW201715211A.
English abstract translation of TW201826659A.
Liao, Yen-Ting. (2009). A Study on The Application of Infrared Thermography to Predictive Maintenance of Machine Electrical Equipment The Case of A TFT-LCD Manufacturer (p. 21-22). Thesis Submitted to Degree Program of Industrial Safety and Risk Management of College of Engineering National Chiao Tung University.
Notification to Grant Patent Right dated Jul. 31, 2023 from CNIPA regarding the Chinese counterpart application 202010001129.X.
Search report dated Jul. 31, 2023 from CNIPA regarding the Chinese counterpart application 202010001129.X.
English Abstract translation of CN101786408A and CN1825075A.

* cited by examiner

THERMAL DETECTION SYSTEM CAPABLE OF PROVIDING EARLY WARNING AND RELATED PRODUCTS

CROSS-REFERENCE TO RELATED APPLICATIONS

The present application claims priority to U.S. Provisional Patent Application No. 62/788,008, filed on Jan. 3, 2019, which is incorporated by reference herein in its entirety

BACKGROUND

The present disclosure relates to thermal detection, and more particularly, to a thermal detection system capable of indicating a human-perceptible area corresponding to a detection area of a thermal detector, and related products.

Recently, increasing concerns have been raised about the risk of personal electronic devices causing property damage, personal injury or death due to defects of the electronic devices that lead to the device overheating or catching fire. To mitigate such risks, some power strips currently on the market include a safety mechanism, whereby when a current overload or temperature abnormality is detected, the power supply is cut off to prevent fire.

However, the above safety mechanism fails to detect some cases of an overheat condition or fire caused by the defective design or build quality of the electronic device plugged into the power strip. For example, in a case where only one direct-current (DC) 2-ampere (2 A) mobile phone charger is connected to a 15 A power strip, when there is a problem inside the charger and an overheat condition occurs, the current overload protection is not activated because the power consumption of the entire AC segment of the power strip remains below 15 amperes. Further, since the overheat condition occurs at a location inside the charger and remote from the electronic device, while the current protection system monitors for temperature abnormality inside the electronic device, the protection system may not detect the overheat condition. As a result, power continues to be supplied and the charger continues to overheat, with potentially serious consequences. Spontaneous combustion of dehumidifiers may also go undetected by the safety mechanism of the power strips, and instead may be detected only when a fire is severe enough to be detected by an indoor smoke detector or fire detector. By the time such an event is detected by the smoke detector or fire detector, even if a sprinkler system is activated immediately, damage is likely to have already occurred.

SUMMARY

It is therefore an objective of the present disclosure to provide an early-warning security scheme. The described embodiments provide a thermal detection system, which can employ an early-warning security scheme and indicate a human-perceptible area corresponding to a detection area of a thermal detector, and related products such as a power delivery device or a piece of furniture.

Some embodiments described herein comprise a thermal detection system. The thermal detection system comprises a thermal detector, an area indicating unit and a control unit. The thermal detector comprises a thermal sensor array. The thermal detector is configured to detect thermal radiation within a detection area around the thermal detector. The detection area is defined by a field of view of the thermal sensor array. The area indicating unit is arranged to indicate a human-perceptible area according to the detection area. The human-perceptible area is located within the detection area and indicates a geometric form of the detection area. The control unit, coupled to the thermal detector and the area indicating unit, is configured to generate a thermal detection result according to the detected thermal radiation.

With the use of the proposed thermal detection systems, the user can easily place the object of interest within the detection area, and have the object of interest stay connected with a power source without raising the risk of a fire.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
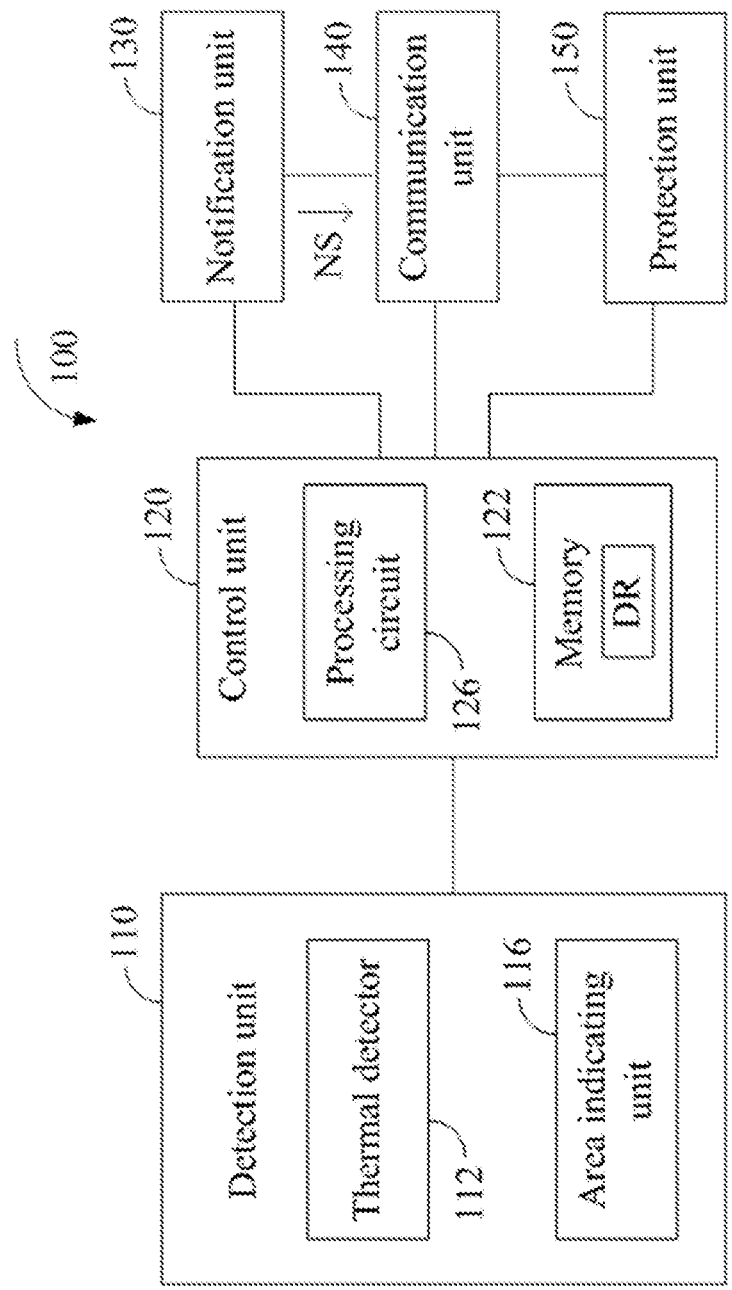
FIG. 1 illustrates a block diagram of an exemplary thermal detection system in accordance with some embodiments of the present disclosure.

The following disclosure provides many different embodiments, or examples, for implementing different features of the provided subject matter. Specific examples of parameter values, components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

The present disclosure describes exemplary thermal detection systems and related products. The exemplary thermal detection systems can provide a human-perceptible area to indicate a detection area of a thermal detector, thus facilitating a user to place an object of interest, such as an electronic device, within the detection area. In some embodiments, the thermal detection systems notify the user of an overheating condition according to a thermal detection result. In some embodiments, the thermal detection systems can provide a protection mechanism for preventing the object of interest from catching fire. With the use of the exemplary thermal detection systems, the user can easily place the object of interest within the detection area, and have the object of interest stay connected with a power source without raising the risk of a fire. Further description is provided below.

FIG. 1 illustrates a block diagram of an exemplary thermal detection system in accordance with some embodiments of the present disclosure. The thermal detection system 100 can be implemented as a power delivery device such as a power strip or a power adapter. In some embodiments, the thermal detection system 100 can be implemented as a piece of furniture such as a desk, a cabinet, a bedside table or a table lamp, which is a piece of illuminated furniture. In some embodiments, the thermal detection system 100 can be implemented as a piece of furniture providing a power delivery function.

The thermal detection system 100 may include, but is not limited to, a detection unit 110 and a control unit 120. The detection unit 110 may include a thermal detector 112 and an area indicating unit 116. The thermal detector 112, including a thermal sensor array (not shown in FIG. 1) such as an infrared (IR) sensor array, can be configured to detect thermal radiation within a detection area around the thermal detector 112. The detection area can be defined by a field of view of the thermal sensor array. For example, the field of view of the thermal sensor array can be represented by a cone. The detection area can be regarded as at least a portion of a cone base viewed by the thermal sensor array of the thermal detector 112 which is placed at a cone apex.

The area indicating unit 116 is arranged to indicate a human-perceptible area according to the detection area which is otherwise not identifiable by human eyes. The human-perceptible area can be located within the detection area, and indicate a geometric form of the detection area. For example, the human-perceptible area can be equal to the detection area, such that a boundary of the human-perceptible area can be located at a boundary of the detection area. As another example, the human-perceptible area can be smaller than or slightly smaller than the detection area, such that a boundary of the human-perceptible area can be located inside the detection area.

In some embodiments, the area indicating unit 116 can be implemented to include an optical area indicating unit, an acoustic area indicating unit, a physical area indicating unit or a combination thereof. The optical area indicating unit can indicate the detection area with visible light or a laser beam. The acoustic area indicating unit can indicate the detection area with an audible sound such that a person can be aware of a range or boundary of the detection area. The physical area indicating unit can indicate the detection area with a physical structure so that a person can see a range or boundary of the detection area.

The control unit 120, coupled to the thermal detector 112 and the area indicating unit 116, is configured to generate a thermal detection result DR according to the detected thermal radiation. In some embodiment, the control unit 120 can activate the area indicating unit 116 automatically. By way of example but not limitation, the control unit 120 can activate the area indicating unit 116 when the thermal detector 112 is activated. In some embodiments, the control unit 120 can activate the area indicating unit 116 according to a user input which requests the thermal detection system 100 to provide a human-perceptible area corresponding to the detection area.

The control unit 120 can be further configured to transmit, process and store temperature data associated with the detected thermal radiation. For example, the control unit 120 may include a memory 122 and a processing circuit 126. The memory 122 can be configured to store the thermal detection result DR. The processing circuit 126, coupled to the memory 122, is configured to determine if an overheating condition occurs at a location within the detection area according to the thermal detection result DR.

In the present embodiment, the thermal detection system 100 may further include a notification unit 130, a communication unit 140 and a protection unit 150. The notification unit 130, coupled to the control unit 120, is configured to generate a notification signal NS according to the thermal detection result DR so as to indicate an operating status, such as an overheating condition, of the thermal detection system 100. The communication unit 140, coupled to the control unit 120, is configured to send out the notification signal NS in a wired or wireless manner. In some embodiment, the communication unit 140 can be configured to allow a user to control the thermal detection system 100 in a wired or wireless manner. For example, the communication unit 140 can be used in various wired or wireless transmission configurations for transmitting a warning, i.e. the notification signal NS, to a user via a mobile phone text message, a voice message or a computer display. The user can also actively establish a link with the thermal detector 112 through the communication unit 140 to check the current and historical temperature status of the detected object.

The protection unit 150, coupled to the control unit 120, is configured to protect an electronic device around thermal detection system 100 from overheating. Protection mechanism of the protection unit 150 can be activated when an abnormal temperature is detected, or based on the user's command. In some embodiments, the protection unit 150 may be implemented to include a protection circuit, such as a power-off circuit, a circuit breaker or a switch circuit. When the thermal detection result DR indicates that a temperature at a location within the detection area is equal to or greater than a threshold value, the protection circuit is configured to cut off power supplied to an electronic device placed at the location. For example, the protection circuit can be configured to selectively cut off power supplied to the electronic device by turning off a power path located between a power cord and the electronic device. When a short-term current overload occurs, the protection circuit can trigger current protection in the power cord to cut off the power.

In some embodiments, the protection unit 150 may be implemented to include a cooling device such as a fire extinguisher. The cooling device can be configured to reduce a temperature of the electronic device. For example, when the thermal detection result DR indicates that a temperature at a location within the detection area is equal to or greater than a threshold value, the cooling device is configured to reduce the temperature.

It is worth noting that as the thermal detector 112 is a detecting component with a specific area, the user is usually made aware of a current monitoring area in order to ensure that an object to be monitored is placed within a correct area, i.e. the detection area. One existing approach is to utilize a forward-looking infrared (FLIR) camera, which allows the user to visually see the monitoring area on a device screen such as a LCD display. However, the FLIR camera is a relatively expensive and complex piece of equipment. Repair and replacement of the FLIR camera is also expensive. Further, although there are existing products on the market, such as thermal-imaging mobile phone cameras including an camera that can display the temperature within the monitoring range on the mobile phone screen, such products fail to achieve the low-cost and long-term continuous temperature detection. Such products also fail to actively cut off a power supply when an abnormal temperature is detected.

In comparison with the existing products, the thermal detection system 100 can provide a human-perceptible area, corresponding to the detection area of the thermal detector 112, to the user during setup, and then independently and continuously monitors a thermal condition within the detection area, all at low cost. For example, with the use of the area indicating unit 116, the thermal detection 100 can provide low-cost schemes which allow the user to observe a thermal condition of the electronic device within the detection area without the aid of a camera or a screen. When an abnormal temperature is detected, the user is notified, and power supplied to an overheating electronic device is immediately cut off. In addition, the overheating electronic device can be easily identified after the power is cut off.

To facilitate understanding of the present disclosure, some embodiments of the proposed thermal detection system are described in the following with reference to a thermal imaging array component, i.e. a thermal detector including a thermal sensor array. Those skilled in the art should appreciate that the proposed thermal detection system can be implemented to include other types of thermal detectors without departing from the scope of the present disclosure.

Figure 2:
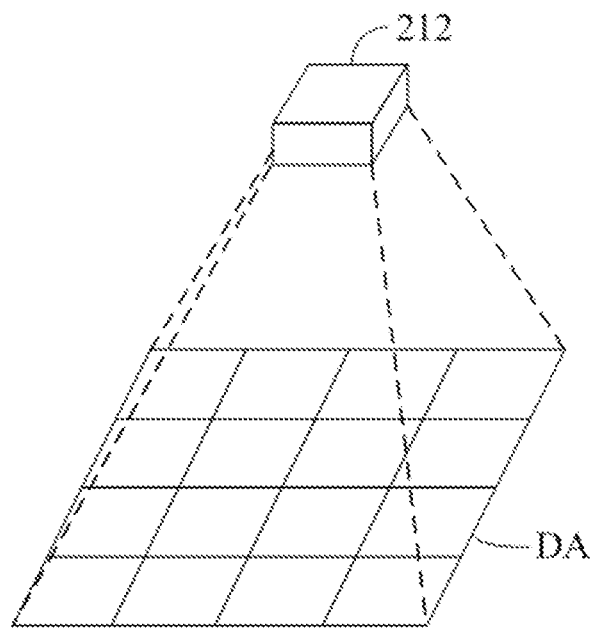
FIG. 2 illustrates an implementation of the thermal detector shown in FIG. 1 in accordance with some embodiments of the present disclosure.

FIG. 2 illustrates an implementation of the thermal detector 112 shown in FIG. 1 in accordance with some embodiments of the present disclosure. Referring FIG. 2 and also to FIG. 1, a thermal imaging array component 212 can be used to implement the thermal detector 112. The thermal imaging array component 212, having a receiving angle that can cover a certain portion of a detection area DA, can be used to achieve full-time and real-time monitoring of a thermal condition of an object located within the detection area DA in a non-contact manner.

The object can be an electronic device, such as a charger or a mobile phone, where an overheating condition may occur. When a temperature of the object reaches an abnormal level, the user may be notified by a visible signal or an audible signal which can be transmitted through the communication unit 140. The visible signal may be a flashing light signal, a text message or other types of visible signals. The audible signal may be a piece of music, a voice warning or other types of audible signals. By way of example but not limitation, when the object is an electronic device such as a consumer electronics device and operates in an environment of 25 degrees, a temperature of a case of the object is about 40 to 50 degrees. If the temperature of the case exceeds 60 degrees, an initial warning can be issued. If the temperature continues to rise and exceeds a critical temperature, e.g. 80 degrees or more, or if the temperature rises too quickly, it is determined that a potential risk has arisen. The user may be notified by a visible signal or an audible signal transmitted in a wired or wireless manner through the communication unit 140. As an abnormal thermal condition of an object can be detected before the object catches fire, the proposed thermal detection system can realize an early-warning security system.

It is worth noting the above temperature threshold values are merely examples, and other temperature threshold values can be defined in the control unit 120. In some embodiments, the above temperature threshold values can be adjusted manually by the user, or set via a learning mode, wherein the control unit 120 can operate in the learning mode to learn a normal temperature range of the detection area DA. In the learning mode, the user can use a control button (not shown) to allow the control unit 120 to learn a normal working temperature range of the detection area DA.

Figure 3:
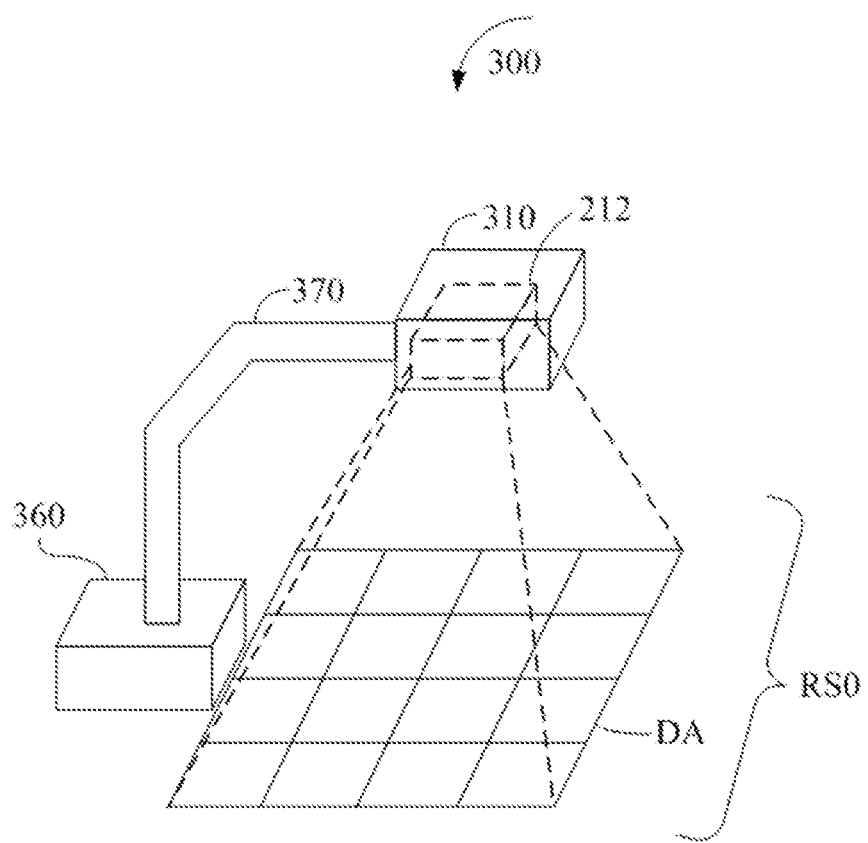
FIG. 3 illustrates an implementation of the thermal detection system shown in FIG. 1 in accordance with some embodiments of the present disclosure.

FIG. 3 illustrates an implementation of the thermal detection system 100 shown in FIG. 1 in accordance with some embodiments of the present disclosure. The thermal detection system 300 includes, but is not limited to, a detection unit 310, a base structure 360 and an arm structure 370. The detection unit 310 can be an embodiment of the detection unit 110 shown in FIG. 1. In the present embodiment, the detection unit 310 and can be implemented to include the thermal imaging array component 212 shown in FIG. 2 having the detection area DA. In the present embodiment, the detection area DA is located on a reference surface RS0 below the thermal imaging array component 212. The base structure 360 can be fixed relative to the reference surface RS0. For example, the base structure 360 can be located on the reference surface RS0.

The arm structure 370, including two ends respectively connected to the detection unit 310 and the base structure 360, can be implemented as a securing structure. In the present embodiment, the arm structure 370 can extend from the base structure 360, such that the thermal imaging array component 212 can observe downward at a certain angle. An area defined by a field of view of the thermal imaging array component 212 may have a fixed range and size, and serve as the detection area DA. In some cases where the arm structure 370 is implemented as a securing structure, the detection area DA can be indicated using a collapsible boundary structure.

Figure 4:
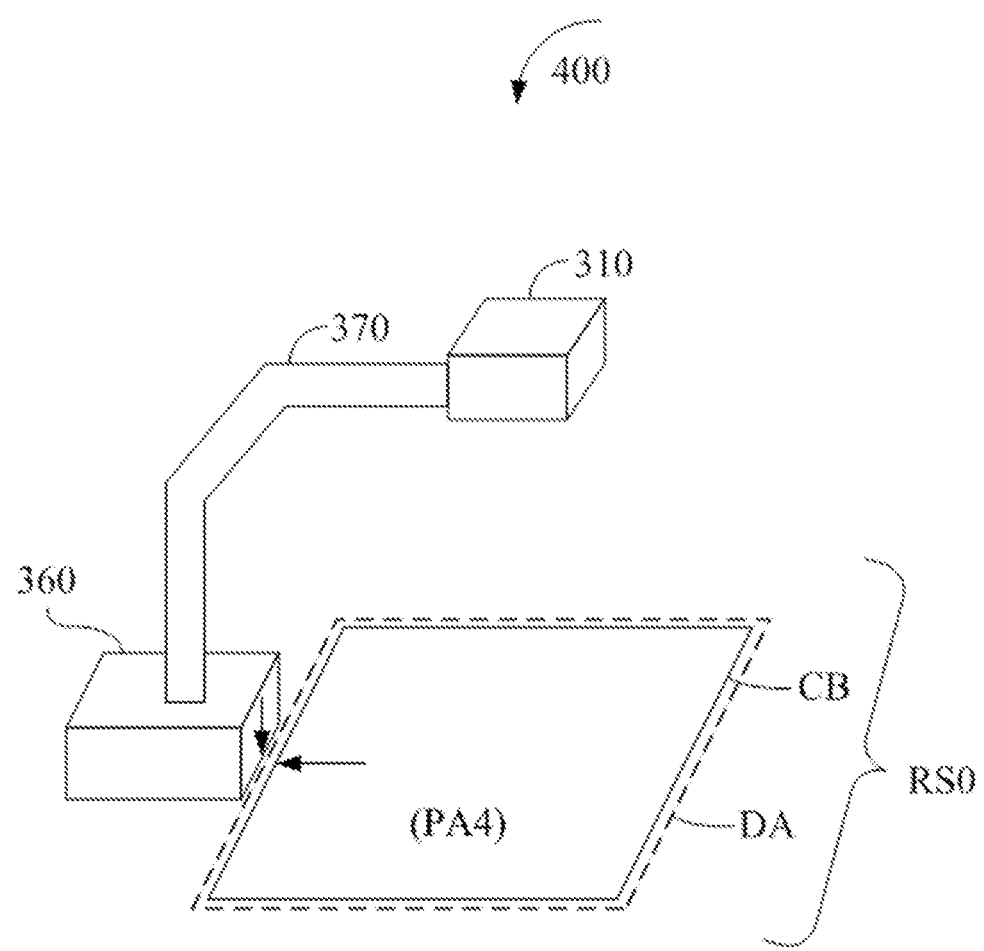
FIG. 4 illustrates an implementation of the thermal detection system shown in FIG. 1 in accordance with some embodiments of the present disclosure.

FIG. 4 illustrates an implementation of the thermal detection system 100 shown in FIG. 1 in accordance with some embodiments of the present disclosure. The thermal detection system 400 is similar/identical to the thermal detection system 300 except that the detection area DA can be indicated with reference to a user manual of the thermal detection system 400. In the present embodiment, the user can visually estimate the detection area. DA with reference to the user manual of the thermal detection system 400. For example, the user can cut a piece of cardboard CB to a specified shape according to the user manual, and align the piece of cardboard CB with the base structure 360 by aligning an arrow on the piece of cardboard CB with an arrow on a side of the base structure 360, As a result, the piece of cardboard CB, i.e. a human-perceptible area PA4, can indicate the detection area DA. In some embodiment, the piece of cardboard CB may be cut from a bigger piece of cardboard which is packaged with or included in the thermal detection system 400.

In some embodiments, the detection area DA can be indicated utilizing an extension mechanism or a collapsible boundary structure located on the reference surface RS0. A detection area boundary line, a board, an extension structure can be defined by pulling out the extension mechanism or stretching out the collapsible boundary structure. The detection area DA can be located within the boundary, on the board or within the range of the extension structure.

Figure 5:
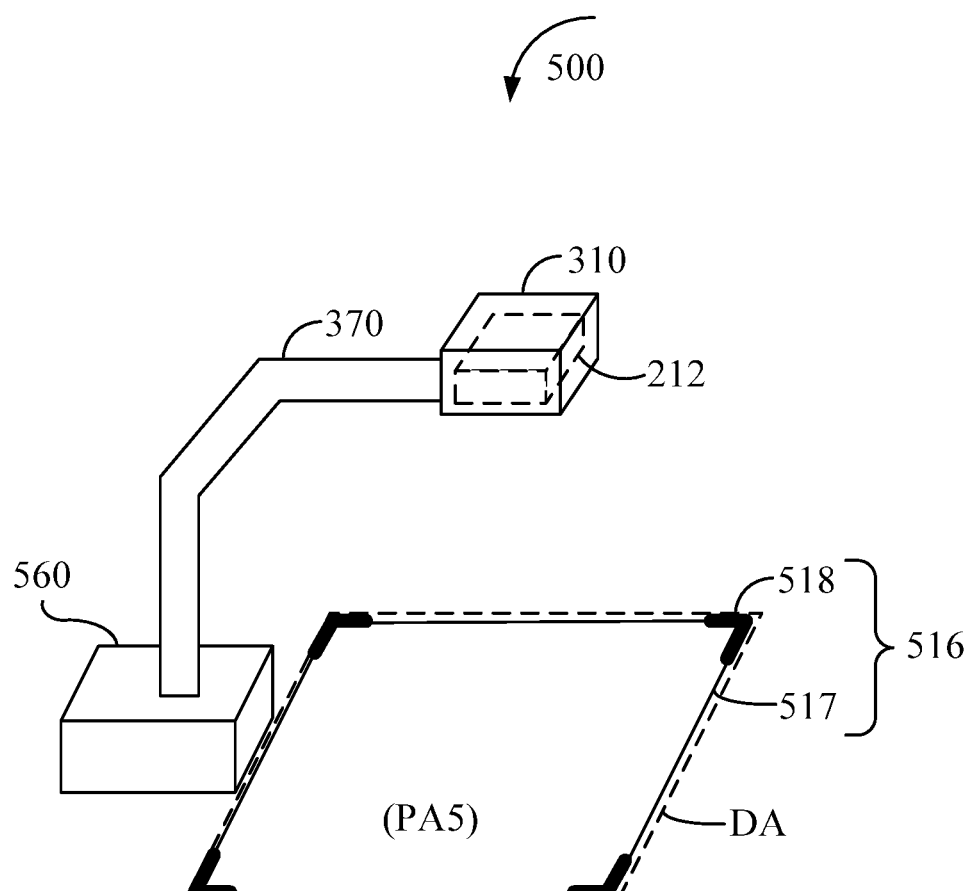
FIG. 5 illustrates an implementation of the thermal detection system shown in FIG. 1 in accordance with some embodiments of the present disclosure.

FIG. 5 illustrates an implementation of the thermal detection system 100 shown in FIG. 1 in accordance with some embodiments of the present disclosure. The thermal detection system 500 is similar/identical to the thermal detection system 300 except that the detection area DA can be indicated by a collapsible boundary structure 516, which can represent at least a portion of an embodiment of the area indicating unit 116 shown in FIG. 1. In addition, the base structure 560 can represent an embodiment of the base structure 360 shown in FIG. 3. When the detection unit 310 or the thermal imaging array component 212 is activated, the collapsible boundary structure 516 can be stretched out to be located on a boundary of the detection area DA. As a result, the collapsible boundary structure 516 can indicate a boundary of a human-perceptible area PA5 associated with the detection area DA. In the present embodiment, the collapsible boundary structure 516 includes a plurality of boundary lines 517 and a plurality of corner components 518 to define the boundary of the human-perceptible area PA5. It is worth noting that, in the present embodiment, when the collapsible boundary structure 516 is collapsed, the base structure 560 can be configured to accommodate the collapsible boundary structure 516.

Figure 6:
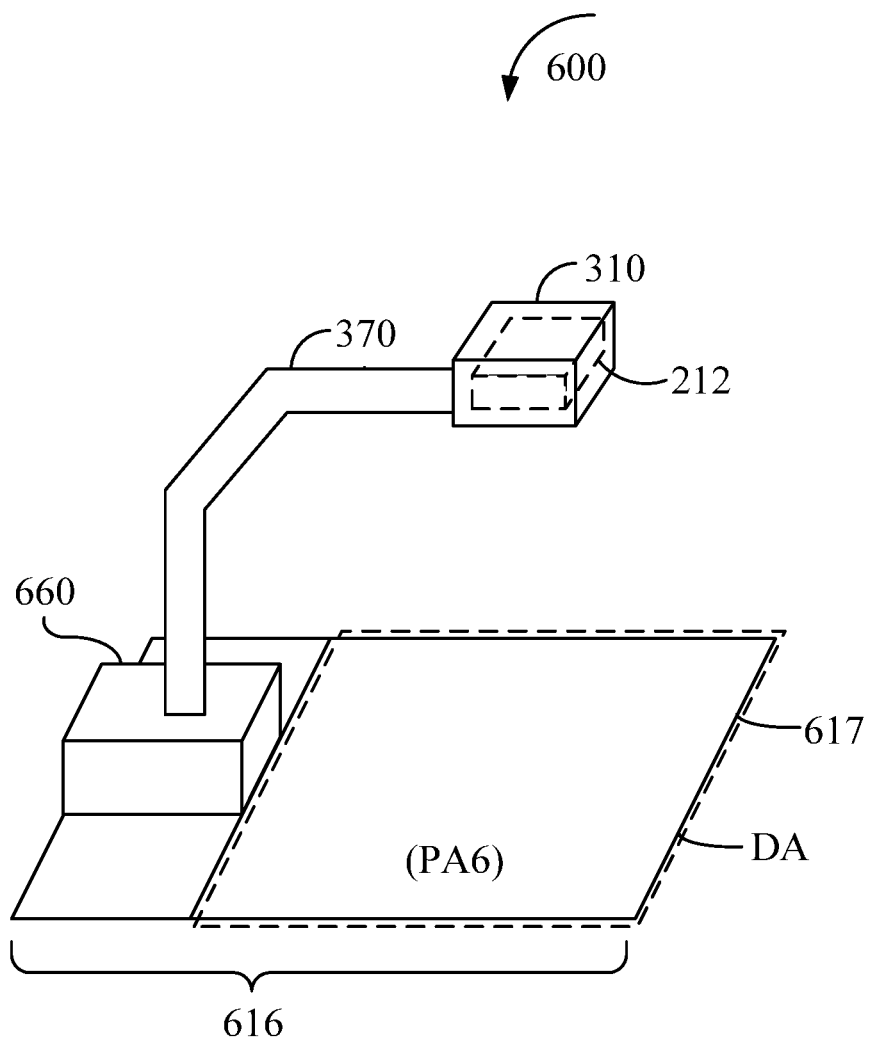
FIG. 6 illustrates an implementation of the thermal detection system shown in FIG. 1 in accordance with some embodiments of the present disclosure.

FIG. 6 illustrates an implementation of the thermal detection system 100 shown in FIG. 1 in accordance with some embodiments of the present disclosure. The thermal detection system 600 is similar/identical to the thermal detection system 300 except that the detection area DA can be indicated by a collapsible boundary structure 616, which can represent at least a portion of an embodiment of the area indicating unit 116 shown in FIG. 1. In addition, the base structure 660 can represent an embodiment of the base structure 360 shown in FIG. 3. When the detection unit 310 or the thermal imaging array component 212 is activated, the collapsible boundary structure 616 can be stretched out to be located on a boundary of the detection area DA, thus indicating a boundary of a human-perceptible area PA6 associated with the detection area DA. In the present embodiment, the collapsible boundary structure 616 includes a foldable board 617 to define the boundary of the human-perceptible area PA6. When the collapsible boundary structure 616 is collapsed, the base structure 660 can be configured to accommodate the collapsible boundary structure 616.

Figure 7:
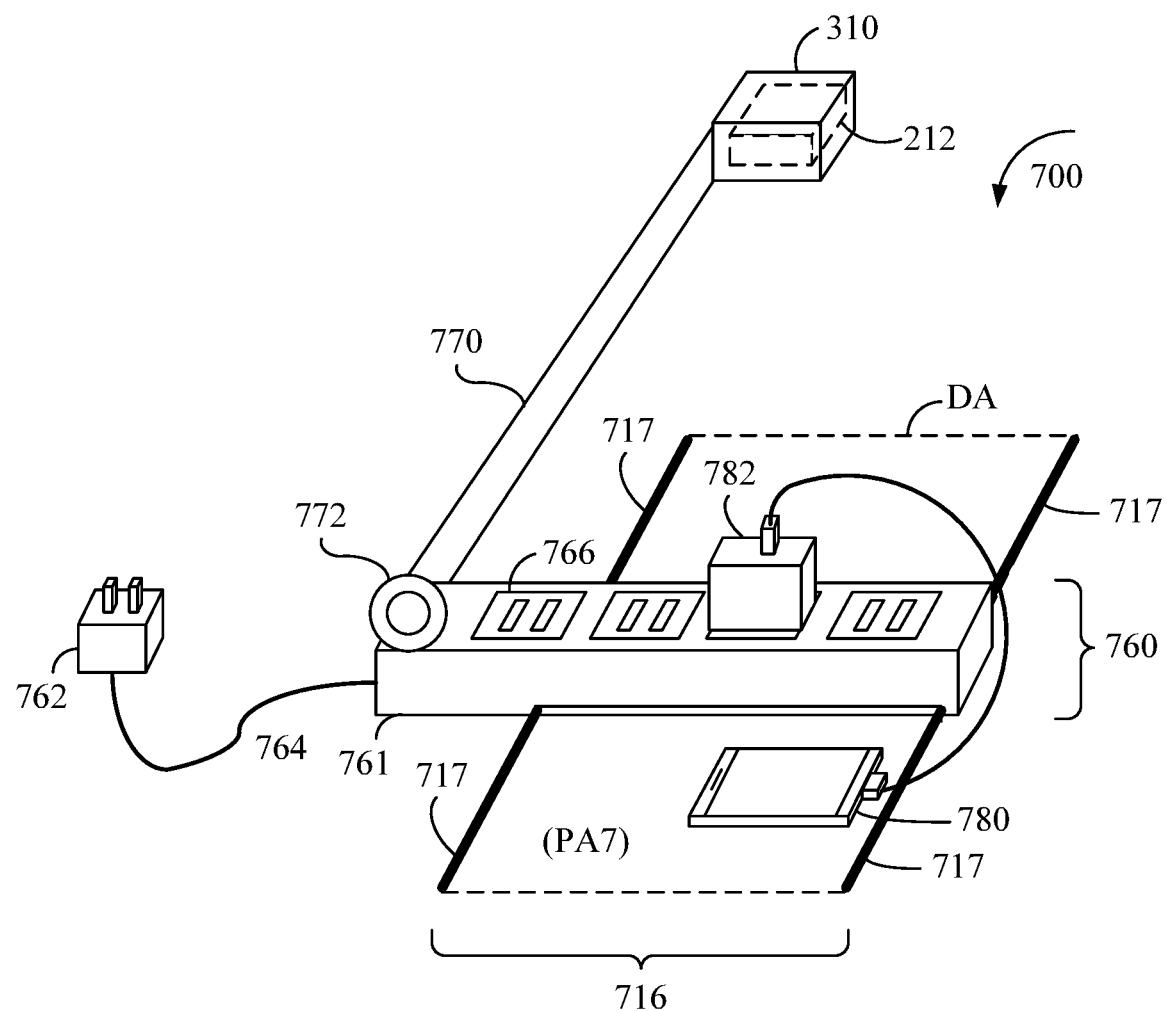
FIG. 7 illustrates an implementation of the thermal detection system shown in FIG. 1 in accordance with some embodiments of the present disclosure.

FIG. 7 illustrates an implementation of the thermal detection system 100 shown in FIG. 1 in accordance with some embodiments of the present disclosure. The thermal detection system 700 is similar/identical to the thermal detection system 300 except that the detection area DA can be indicated by a collapsible boundary structure 716, which can represent at least a portion of an embodiment of the area indicating unit 116 shown in FIG. 1. In addition, the base structure 760 and the arm structure 770 can represent embodiments of the base structure 360 and the arm structure 370 shown in FIG. 3, respectively. When the detection unit 310 or the thermal imaging array component 212 is activated, the collapsible boundary structure 716 can be stretched out to be located on a boundary of the detection area DA, thus indicating a boundary of a human-perceptible area PA7 associated with the detection area. DA. In the present embodiment, the collapsible boundary structure 716 includes a plurality of rotatable sticks 717 to define the boundary of the human-perceptible area PA7. When the collapsible boundary structure 716 is collapsed, the base structure 760 can be configured to accommodate the collapsible boundary structure 716.

Additionally, in the present embodiment, the base structure 760 can be implemented using a power strip including a casing 761, a power plug 762, a power cord 764, and one or more electrical receptacles 766. The electrical receptacles 766 are disposed on a portion of an outer surface of the casing 761, while another end of the arm structure 770 is disposed on another portion of the outer surface of the casing 761. The base structure 760 can be used to supply power to an electronic device 780 located within the detection area DA through one of the electrical receptacles 766 and a charger 782. At least one of the electrical receptacles 766 can be implemented as an alternating-current (AC) female outlet, a universal serial bus (USB) receptacle or other types of electrical receptacles. It is worth noting that the arm structure 770 can be connected to the base structure 760 through a rotating shaft 772 thereof. As a result, the detection area DA can be adjusted in response to movement of the arm structure 770.

In some embodiments, the detection area DA can be indicated utilizing a sound generator capable of indicating that an object is passing through a boundary of a human-perceptible area located on a reference surface.

Figure 8:
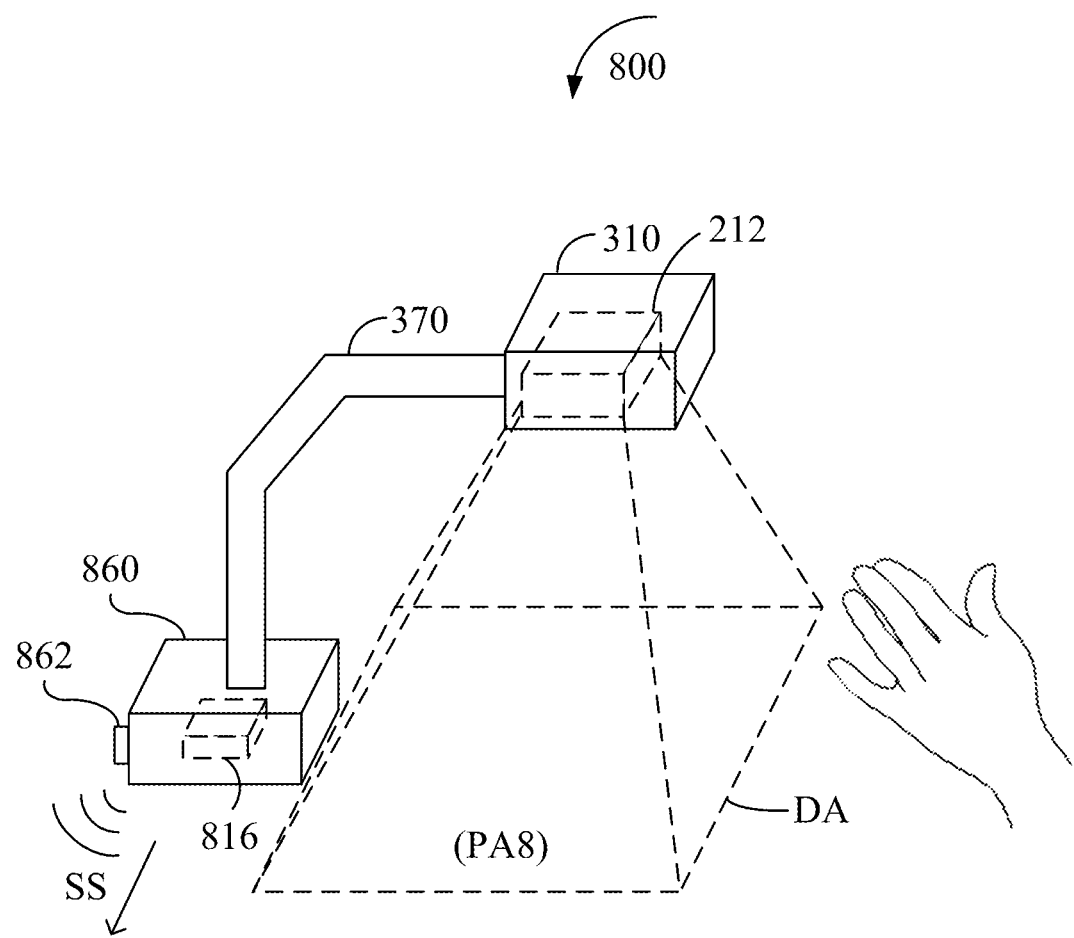
FIG. 8 illustrates an implementation of the thermal detection system shown in FIG. 1 in accordance with some embodiments of the present disclosure.

FIG. 8 illustrates an implementation of the thermal detection system 100 shown in FIG. 1 in accordance with some embodiments of the present disclosure. The thermal detection system 800 is similar/identical to the thermal detection system 300 except that the detection area DA can be indicated by a sound generator 816 which can include a speaker. The sound generator 816 can represent at least a portion of an embodiment of the area indicating unit 116 shown in FIG. 1. In the present embodiment, when a thermal detection result, generated by a control unit such as the control unit 120 shown in FIG. 1, indicates that a temperature at a boundary of the detection area. DA reaches a threshold value, the sound generator 816 is configured to generate a sound signal SS to indicate that an object is passing through a boundary of a human-perceptible area PA8. As a result, the user can move an object such as a hand to learn a boundary of the human-perceptible area PA8.

For example, when the hand is passing through a boundary of the detection area DA, a temperature at the boundary of the detection area DA may reach a threshold value. As a result, when the thermal detection result indicates that the temperature at the boundary of the detection area DA reaches the threshold value, it is determined that the hand is passing through the boundary of the human-perceptible area PA8. As another example, when the hand is passing through a boundary of the detection area DA, a rate of change of the temperature at the boundary of the detection area DA may reach a threshold value within a predetermined period of time. As a result, when the thermal detection result indicates that the rate of change of the temperature at the boundary of the detection area DA reaches the threshold value within the predetermined period of time, it is determined that the hand is passing through the boundary of the human-perceptible area PA8.

In some embodiments, a button 862 for confirming the detection area DA can be installed in the thermal detection system 800. When the button 862 is pressed, a hand moves toward the detection area DA. When the hand is passing through or located within the detection area DA, the sound generator 816 can alert the user by the sound signal SS. When the hand leaves the detection area DA, the sound generator 816 can stop generating the sound signal SS. Accordingly, the size and range of the detection area DA is made known to the user.

In some embodiments, a detection area can be indicated utilizing an optical area indicating unit. For example, the proposed thermal detection system can include a visible light source or a laser light source. Also, a light-guiding structure can be used to adjust/limit an emission angle or shape of a beam of light. As a result, a combination of the visible/laser light source and the light-guiding structure can be integrated into a detection unit of the proposed thermal detection system, thus functioning to form an optical area indicating unit for indicating the detection area of a thermal detector.

Figure 9:
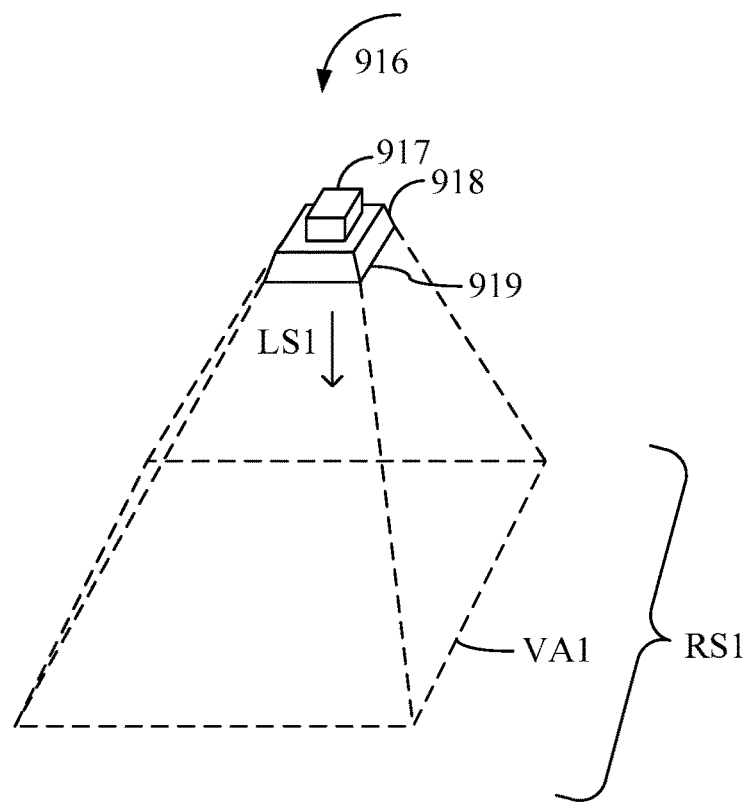
FIG. 9 illustrates an implementation of the area indicating unit shown in FIG. 1 in accordance with some embodiments of the present disclosure.

FIG. 9 illustrates an implementation of the area indicating unit 116 shown in FIG. 1 in accordance with some embodiments of the present disclosure. The area indicating unit 916 may include a light emitting device 917 and a light guiding structure 918. The light emitting device 917, controlled by the control unit 110 shown in FIG. 1, can be configured to emit a light signal LS1. In the present embodiment, the light emitting device 917 can be implemented using, but is not limited to, one or more light emitting diodes (LEDs).

The light guiding structure 918 can be configured to guide the light signal LS1 toward a reference surface RS1 to form a visible area VA1 on the reference surface RS1, wherein the visible area VA1 can serve as a human-perceptible area. In the present embodiment, the light guiding structure 918 can be configured to output the light signal LS1 through a light exit side 919, wherein the light exit side 919 has a geometric form identical to a geometric form of the detection area DA shown in FIG. 2. For example, the light guiding structure 918 can be implemented using a quadrangular cone with a three-dimensional hole structure. In addition, the light guiding structure 918 can be placed in front of the light emitting device 917, thereby forming a shape of the light signal LS1 emitted from the light emitting device 917 as a quadrangular cone. The light signal LS1 can be projected onto the reference surface RS1 to form a quadrangular illuminated range, which serves as the visible area VA1.

Figure 10:
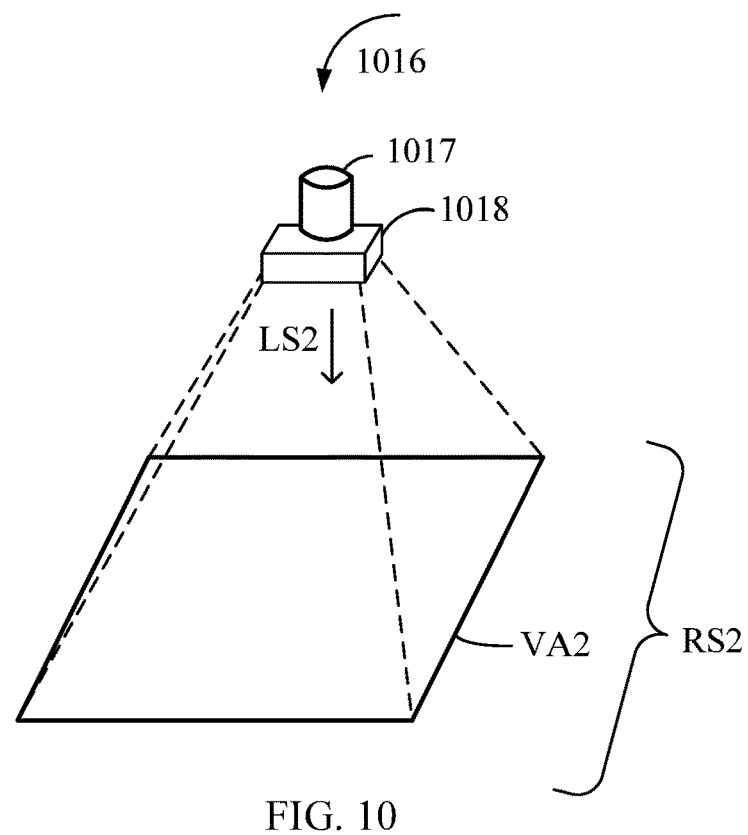
FIG. 10 illustrates an implementation of the area indicating unit shown in FIG. 1 in accordance with some embodiments of the present disclosure.

FIG. 10 illustrates an implementation of the area indicating unit 116 shown in FIG. 1 in accordance with some embodiments of the present disclosure. The area indicating unit 1016 may include a light emitting device 1017 and a light guiding structure 1018. The light emitting device 1017, controlled by the control unit 1010 shown in FIG. 1, can be configured to emit a light signal LS2. In the present embodiment, the light emitting device 1017 can be implemented using, but is not limited to, a laser module.

The light guiding structure 1018 can be configured to guide the light signal LS2 toward a reference surface RS2 to form a visible area VA2 on the reference surface RS2, wherein the visible area VA2 can serve as a human-perceptible area. In the present embodiment, the light guiding structure 1018 can be implemented using an optical diffraction structure such as a diffraction plate. For example, the light guiding structure 1018 can be placed in front of the light emitting device 1017 such as a laser module to change a shape of the light signal LS2. The light signal LS2 can be diffracted to form a plurality of light points defining the visible area VA2. In some embodiments, the light points can be arranged as an array of points representing the visible area VA2. In some embodiments, the light points can be arranged as a plurality of lines representing a boundary of the visible area VA2. In some embodiments, the light points can be arranged as a plurality of points representing vertices of the visible area VA2.

Figure 11:
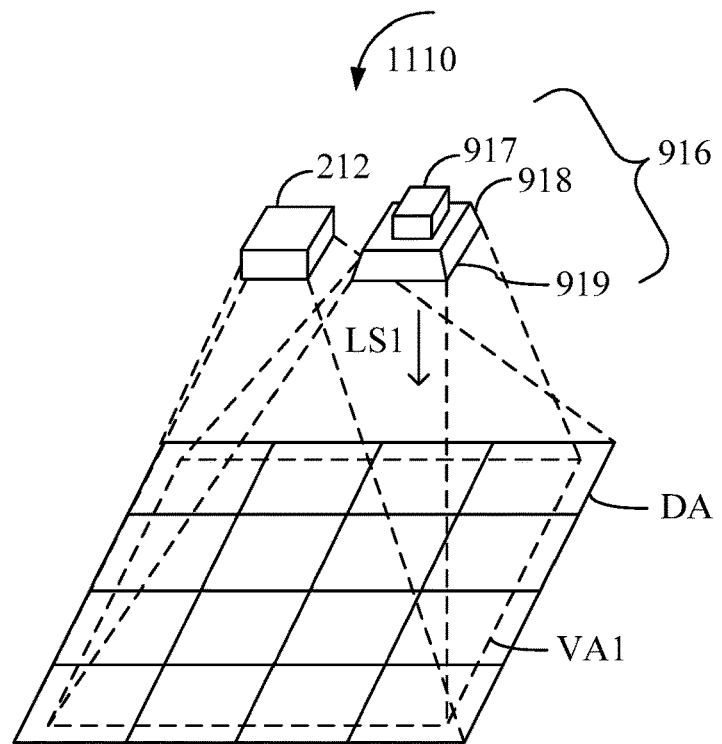
FIG. 11 illustrates an implementation of the detection unit shown in FIG. 1 in accordance with some embodiments of the present disclosure.

FIG. 11 illustrates an implementation of the detection unit 110 shown in FIG. 1 in accordance with some embodiments of the present disclosure. In the present embodiment, the detection unit 1110 can be implemented to include the thermal imaging array component 212 shown in FIG. 2 and the area indicating unit 916 shown in FIG. 9. The visible area VA1, i.e. the human-perceptible area indicated by the area indicating unit 916, can be the same as or slightly smaller than the detection area DA of the thermal imaging array component 212. Therefore, the user can know the correct detection area DA by observing the visible area VA1 formed by the light signal LS1.

Figure 12:
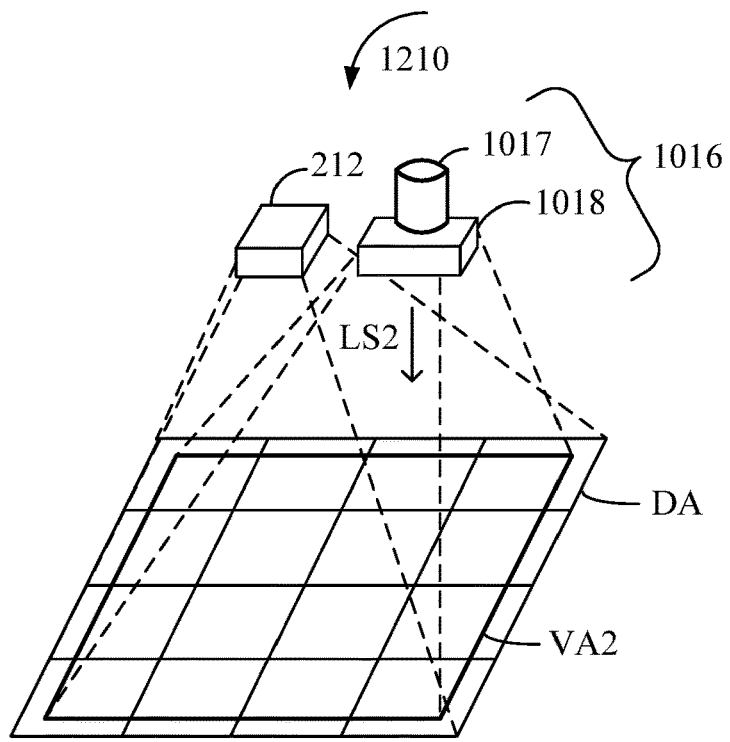
FIG. 12 illustrates an implementation of the detection unit shown in FIG. 1 in accordance with some embodiments of the present disclosure.

FIG. 12 illustrates an implementation of the detection unit 110 shown in FIG. 1 in accordance with some embodiments of the present disclosure. In the present embodiment, the detection unit 1210 can be implemented to include the thermal imaging array component 212 shown in FIG. 2 and the area indicating unit 1016 shown in FIG. 10. The visible area VA2, i.e. the human-perceptible area indicated b the area indicating unit 1016, can be the same as or slightly smaller than the detection area DA of the thermal imaging array component 212. For example, the boundary of the visible area VA2, defined by the light points, can be the same as or slightly shorter than the boundary of the detection area DA. The user can know the correct detection area DA by observing the visible area VA2 formed by the light signal LS2.

Figure 13:
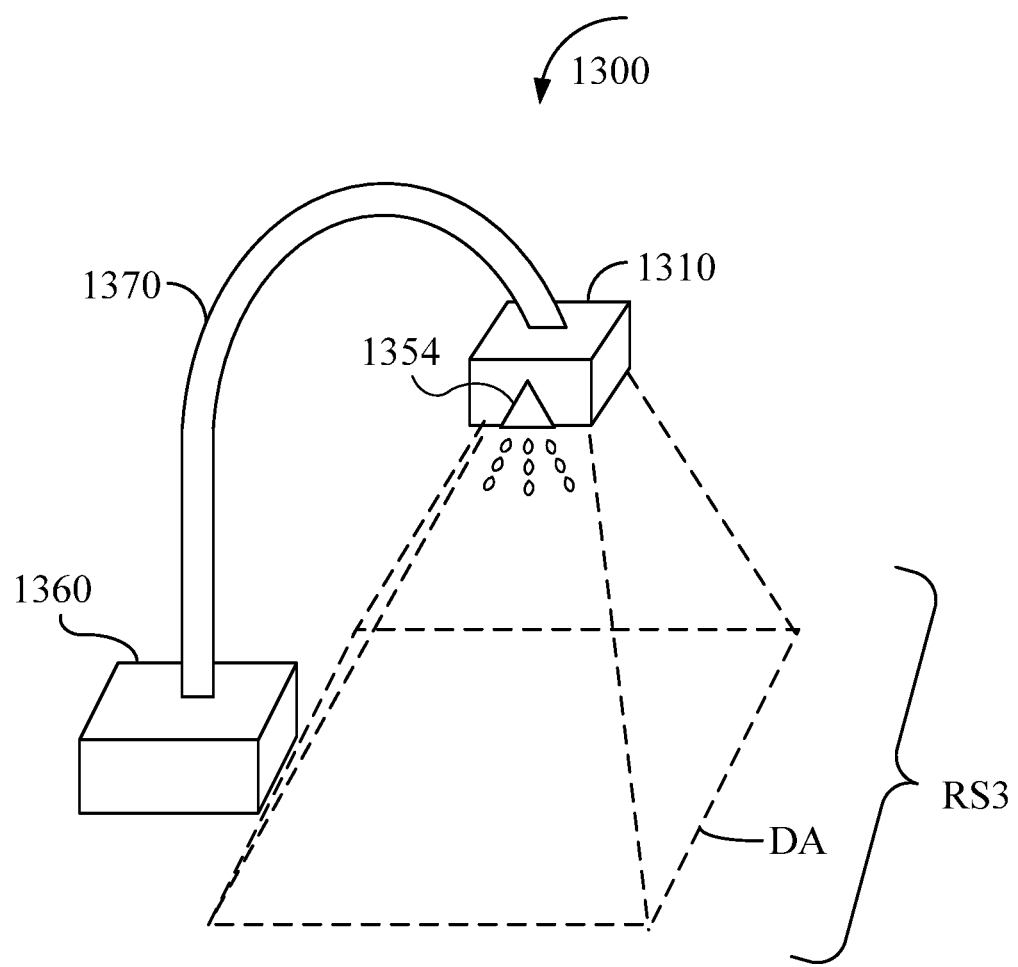
FIG. 13 illustrates an implementation of the thermal detection system shown in FIG. 1 in accordance with some embodiments of the present disclosure.

It is worth noting that an arm structure connected to a detection unit of the proposed thermal detection system may be implemented by a flexible structure. As a result, the detection unit can be adjusted or oriented at any angle, thereby adjusting a detection area thereof. Referring to FIG. 13, an implementation of the thermal detection system 100 shown in FIG. 1 is illustrated in accordance with some embodiments of the present disclosure. The thermal detection system 1300 may include a detection unit 1310, a base structure 1360 and an arm structure 1370. The detection unit 1310 can be implemented by at least one of the detection unit 310 shown in FIG. 3, the detection unit 1110 shown in FIG. 11 and the detection unit 1210 shown in FIG. 12. The base structure 1360 can be implemented by at least one of the base structure 360 shown in FIG. 3, the base structure 560 shown in FIG. 5, the base structure 660 shown in FIG. 6, the base structure 760 shown in FIG. 7 and the base structure 860 shown in FIG. 8. In the embodiment, the base structure 1360 may be fixed relative to a reference surface RS3 where the detection area DA is located.

The arm structure 1370 includes two ends respectively connected to the detection unit 1310 and the base structure 1360. In the present embodiment, the arm structure 1370 can be implemented as a flexible structure, which is flexible to allow relative movement between the detection unit 1310 and the reference surface RS3 to adjust the detection area DA. The flexible structure can be a universally adjustable bent tube, a bendable metal tube or other types of flexible structures. As a result, the detection unit 1310, mounted on the arm structure 1370, can be moved to adjust the detection area DA.

In the present embodiment, the thermal detection system 1300 may further include a cooling device 1354 such as a fire extinguisher, which can be mounted or disposed on, but not limited to, the detection unit 1310. When the thermal detection system 1300 detects that a temperature at a location within the detection area DA is greater than or equal to a threshold value, the cooling device 1310 can be configured to reduce the temperature at the location. It is worth noting that the cooling device 1354 can be disposed at other locations, e.g. mounted on the arm structure 1370, without departing from the scope of the present disclosure.

It is worth noting at each of the arm structures described in the embodiments shown in FIG. 3 to FIG. 8 can be replaced with a flexible structure such as the arm structure 1370. For example, in some embodiments where the arm structure 370 shown in FIG. 8 is replaced with a flexible structure such as the arm structure 1370 shown in FIG. 13, the user still can move an object such as a hand to learn a boundary of a human-perceptible area, which can be adjusted according adjustment of the detection area DA.

Figure 14:
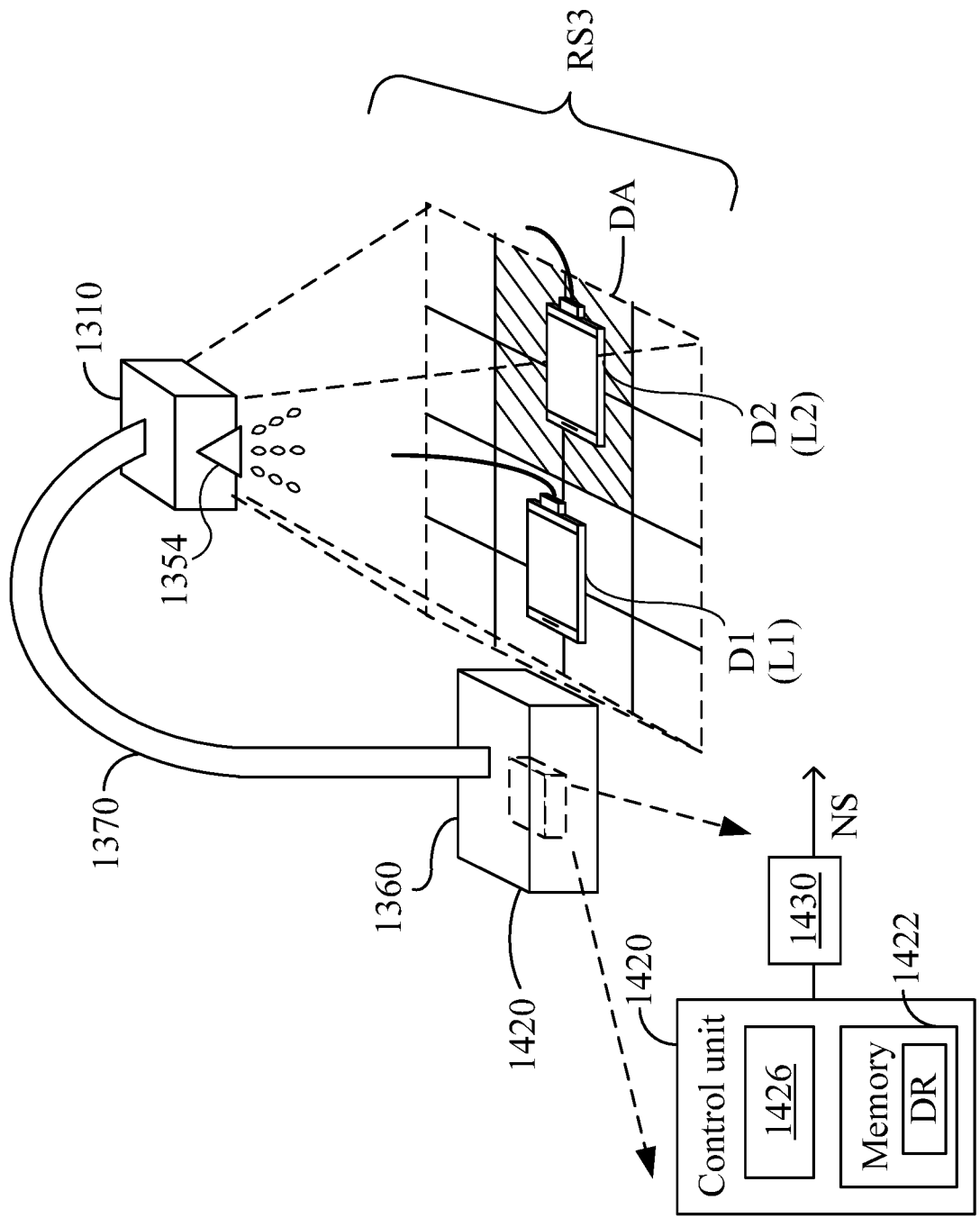
FIG. 14 illustrates an operating scenario of the thermal detection system shown in FIG. 13 in accordance with some embodiments of the present disclosure.

In some embodiments, the proposed thermal detection system can report a position where an abnormality occurs with the aid of the proposed detection unit. FIG. 14 illustrates an operating scenario of the thermal detection system 1300 shown in FIG. 13 in accordance with some embodiments of the present disclosure. In the present embodiment, a plurality of objects D1 and D2, i.e. two mobile phones, are placed at locations L1 and L2 respectively in the detection area DA. Additionally, a control unit 1420 and a notification unit 1430 can be disposed, but not limited to, within the base structure 1360. The control unit 1420 and the notification unit 1430 can represent embodiments of the control unit 120 and the notification unit 130 shown in FIG. 1 respectively.

When the thermal detection result DR indicates a temperature at the location L1/L2 on the detection area DA is greater than or equal to a threshold value, the notification unit 1430 can be configured to generate the notification signal NS to indicate that an overheating condition occurs. The notification signal NS can be, for example, a visible signal or an audible signal. When the notification NS is an audible signal or a voice warning, the notification unit 1430 can be implemented to include a sound generator such as the sound generator 816. In other words, the sound generator 816 can be reused for notification, or the notification unit 1430 can be reused as a sound generator for indicating a human-perceptible area.

In some embodiments, when the thermal detection result DR indicates a rate of change of a temperature at the location L1/L2 on the detection area DA is greater than or equal to a threshold value, the notification unit 1430 can be configured to generate the notification signal NS to indicate that an overheating condition occurs. When notified by the notification signal NS, the user may want to know which object exhibits a temperature abnormality, thereby addressing such thermal abnormality. For example, in the present embodiment, the object D1 operates normally while the object D2 exhibits a temperature abnormality, which triggers a warning, i.e. the notification signal NS, to notify the user. The user may want to take out the object D2 for inspection.

Figure 15:
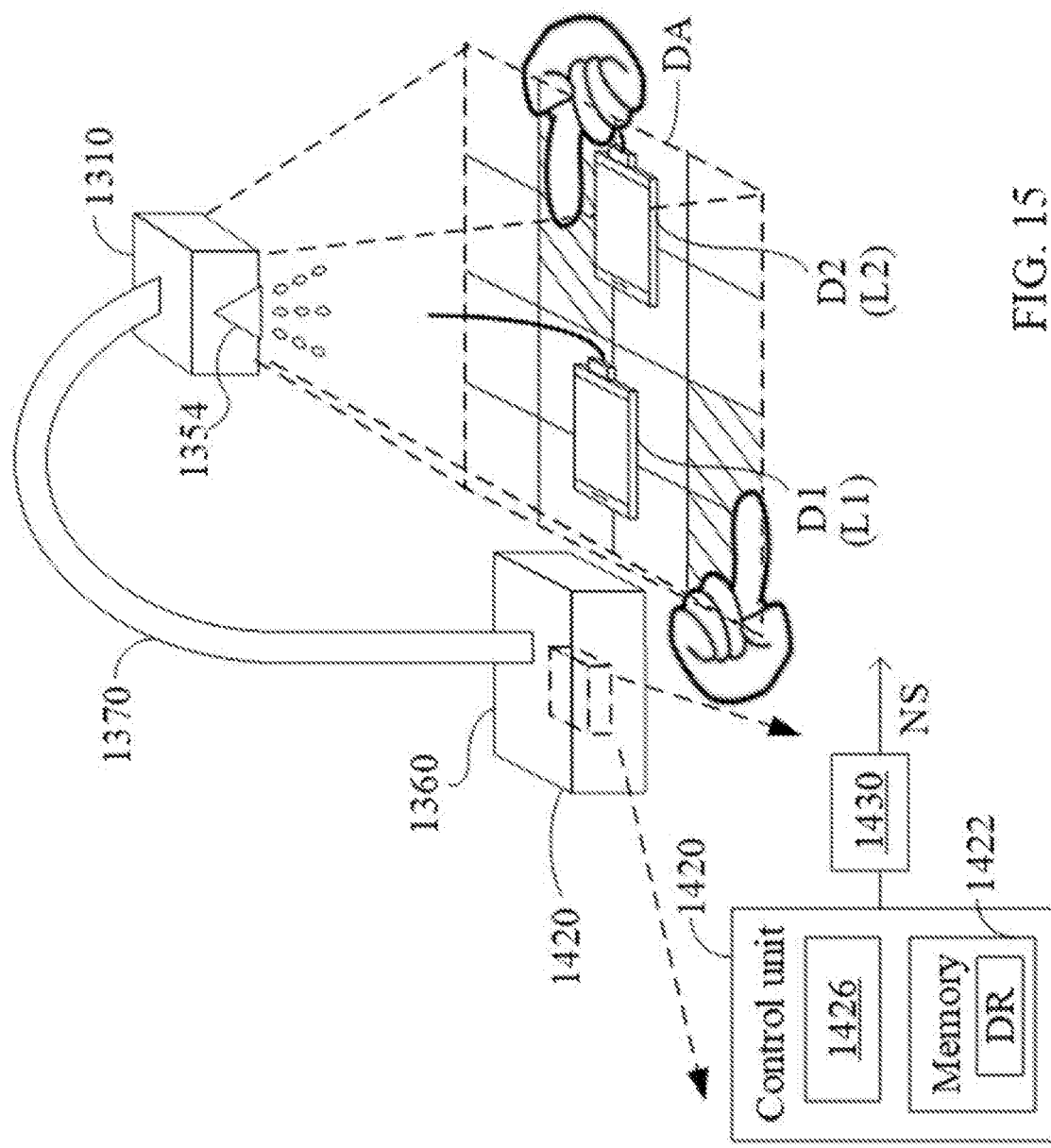
FIG. 15 illustrates an operating scenario of the thermal detection system shown in FIG. 13 in accordance with some embodiments of the present disclosure.

In the present embodiment, the user may move an object such as a hand to determine which object exhibits a temperature abnormality. Referring to FIG. 15, a memory 1422 of the control unit 1420 can be configured to store the thermal detection result DR, which may include information on historical data and abnormal temperature area detected by the detection unit 1310. A processing circuit 1426 of the control unit 1420 can configured to determine if an object, e.g. a user's hand, is passing over a location within the detection area DA according to the thermal detection result DR stored in the memory 1422. When the processing circuit 1426 determines that the object is passing over the location, the notification unit 1430 can generate the notification signal NS to indicate that the overheating condition occurred at the location.

When the user wants to look up the information stored in the memory 1422 or find out which object exhibited a thermal abnormality, the thermal detection system 1400 may enter a mode of operation. For example, the user may press a button (not shown in FIG. 15) to enable the thermal detection system 1400 to enter the mode of operation. Next, the user may move his or her hand above the objects D1 and D2 to determine which object exhibited a thermal abnormality. In the present embodiment, when the user moves the hand to pass over the location L2, the processing circuit 1426 can refer to the thermal detection result to determine that the hand is passing over a location where a thermal abnormality occurred. As a result, the processing circuit 1426 can control the notification unit 1430 to output the notification signal NS to inform the user that an object of interest is found.

With the use of the above-described methods, which refer to the information stored in the memory 1422 to determine a location where a thermal abnormality occurred, the user can confirm which object exhibited an overheating condition after the notification unit 1430 has sent out the notification signal NS, or after the protection unit 150 shown in FIG. 1 has performed overheating protection such as cutting off power or cooling the object. Accordingly, the user can take out the object D2 and take steps to address the overheating problem.

Figure 16:
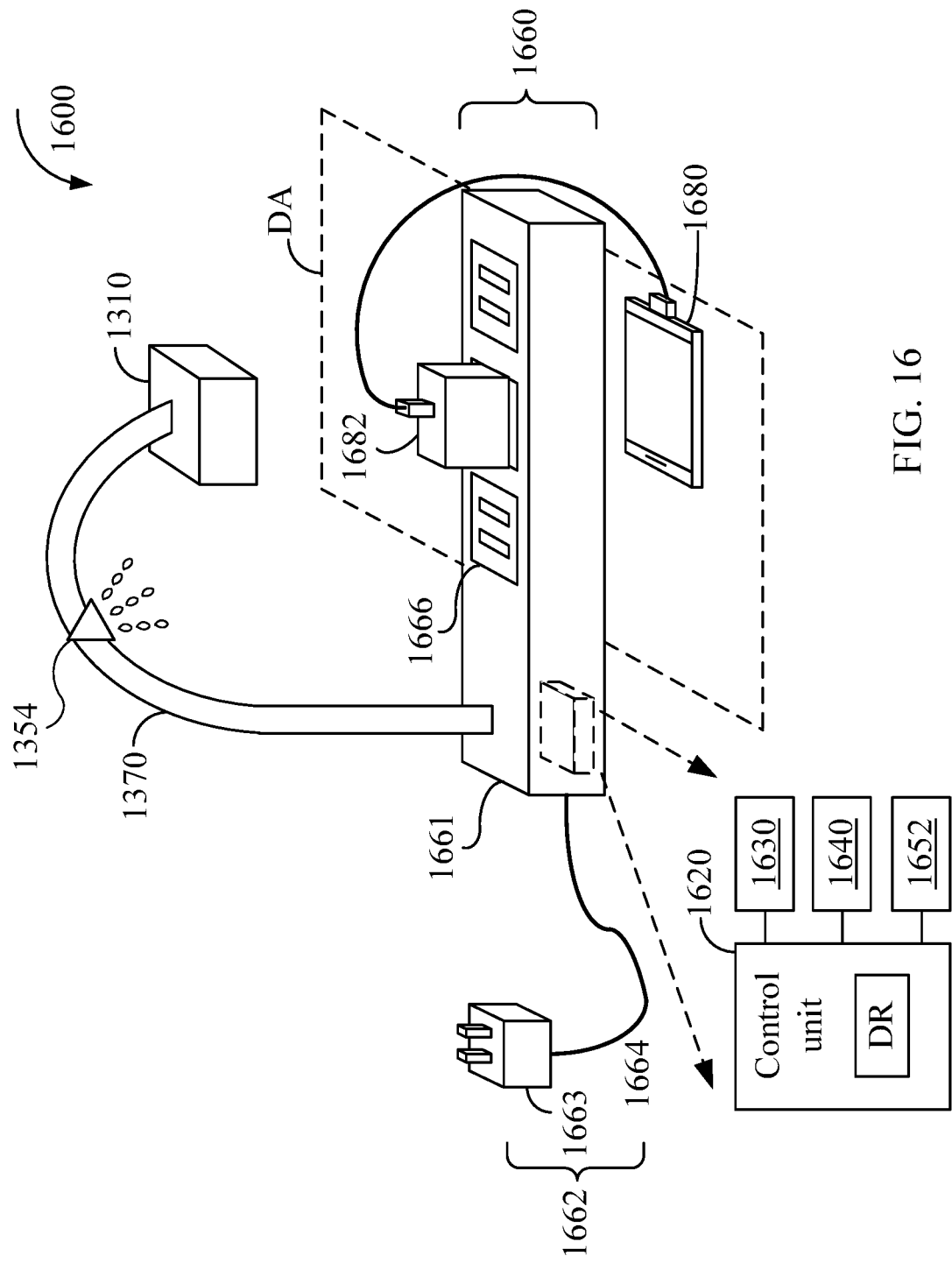
FIG. 16 illustrates an implementation of the thermal detection system shown in FIG. 1 in accordance with some embodiments of the present disclosure.

The proposed thermal detection system can be applied in various types of products. FIG. 16 illustrates an implementation of the thermal detection system 100 shown in FIG. 1 in accordance with some embodiments of the present disclosure. In the present embodiment, the thermal detection system 1600 can be applied to a power delivery device. The thermal detection system 1600 includes, but is not limited to, the detection unit 1310, the cooling device 1354 and the arm structure 1370 shown in FIG. 13, a control unit 1620, a notification unit 1630, a communication unit 1640, a protection circuit 1652 and a base structure 1660. The control unit 1620 can represent an embodiment of the control unit 120 shown in FIG. 1. The notification unit 1630 can represent an embodiment of the notification unit 130 shown in FIG. 1. The communication unit 1640 can represent an embodiment of the communication unit 140 shown in FIG. 1. The protection circuit 1652 can represent an embodiment of the protection unit 150 shown in FIG. 1.

The base structure 1660 can be implemented to include a power strip capable of delivering power. The base structure 1660 may include a casing 1661, a power connector 1662 and a plurality of electrical receptacles 1666. In the present embodiment, each of the control unit 1620, the notification unit 1630, the communication unit 1640 and the protection circuit 1652 can be disposed within the casing 1661. However, in some embodiments, at least one of the control unit 1620, the notification unit 1630 and the protection circuit 1652 can be disposed outside the casing 1661 without departing from the scope of the present disclosure. By way of example but not limitation, at least one of the control unit 1620, the notification unit 1630, the communication unit 1640 and the protection circuit 1652 can be mounted on the casing 1661.

The power connector 1662 can be implemented to include a power plug 1663 and a power cord 1664. The power connector 1662, selectively coupled to the electrical receptacles 1666, is configured to supply power to an electronic device 1680 such as a mobile phone at a location within the detection area DA. The electronic device 1680 is coupled to one of the electrical receptacles 1666 through a charger 1682 which is plugged into the one of the electrical receptacles 1666. At least one of the electrical receptacles 1666 can be implemented as an AC female outlet, a USB receptacle or other types of electrical receptacles. For example, when the thermal detection result DR generated by the control unit 1620 indicates that a temperature at a location is less than a first threshold value, the protection circuit 1652 can be configured to couple the power connector 1662 to the one of the electrical receptacles 1666, such that the power supplied by the power connector 1662 can be delivered to the electronic device 1680. When the thermal detection result DR indicates that the temperature at the location is greater than or equal to the first threshold value, the protection circuit 1652 can be configured to uncouple the power connector 1662 from the one of the electrical receptacles 1666. In some embodiments, the protection circuit 1652 can be configured to uncouple the power connector 1662 from all of the electrical receptacles 1666. As a result, the power supplied by the power connector 1662 can be cut off to protect all electronic devices connected to the electrical receptacles 1666.

In the present embodiment, the cooling device 1354 such as a fire extinguisher can be mounted on, but is not limited to, the arm structure 1370. When the thermal detection result DR indicates that the temperature at the location is greater than or equal to a second threshold value greater than the first threshold value, the cooling device 1354 can be configured to reduce the temperature at the location. It is worth noting that the cooling device 1354 can be disposed at other locations, e.g. mounted on the detection unit 1310 as illustrated in FIG. 13, without departing from the scope of the present disclosure.

Additionally or alternatively, when the thermal detection result DR indicates that the temperature at the location exhibits a temperature abnormality, the notification unit 1630 can notify the user via a visible signal or an audible signal transmitted in a wired or wireless manner through the communication unit 1640. As those skilled in the art can appreciate the operation of the thermal detection system 1600 after reading the above paragraphs directed to FIG. 1 to FIG. 15, further description is omitted here for brevity.

Figure 17:
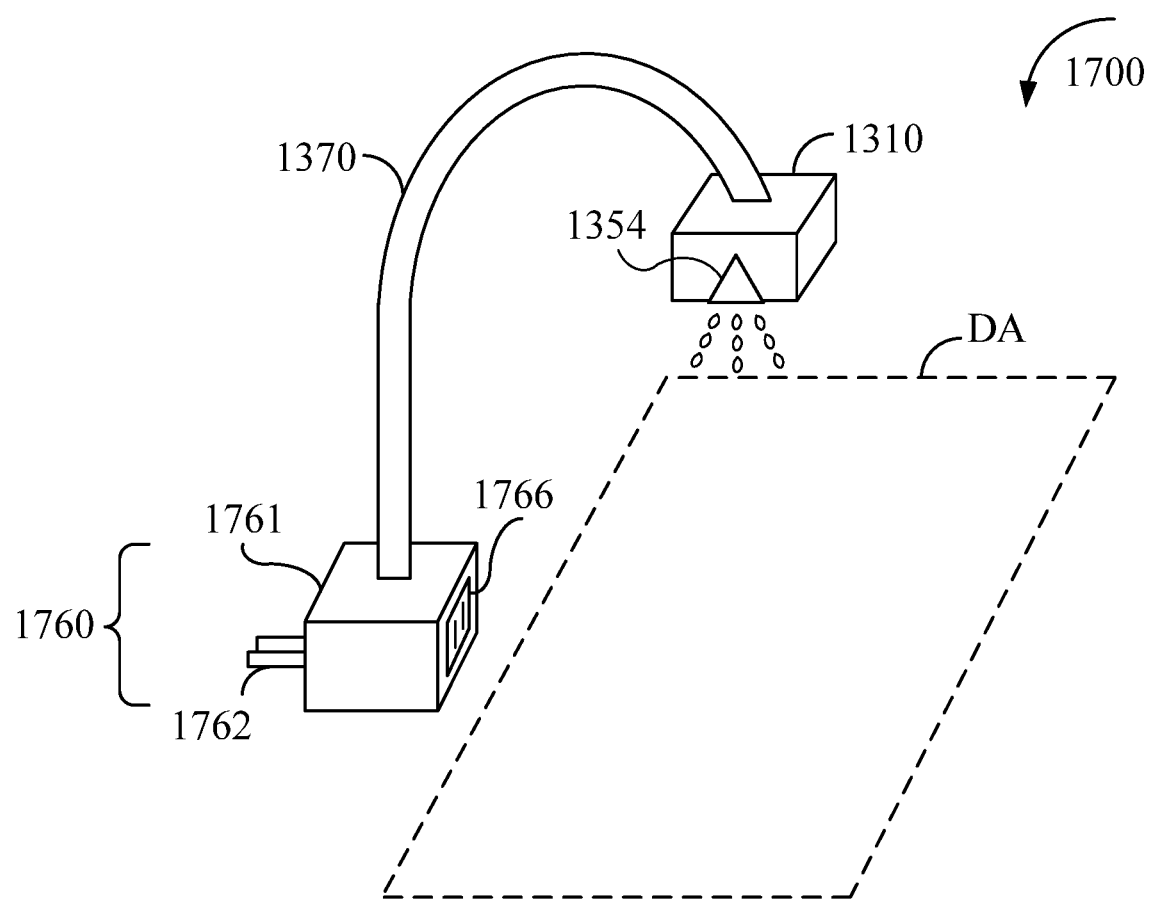
FIG. 17 illustrates an implementation of the thermal detection system shown in FIG. 1 in accordance with some embodiments of the present disclosure.

FIG. 17 illustrates an implementation of the thermal detection system 100 shown in FIG. 1 in accordance with some embodiments of the present disclosure. The structure of the thermal detection system 1700 is similar/identical to the structure of the thermal detection system 1600 shown in FIG. 16 except that the base structure 1760 is implemented to include a power adapter, which includes a casing 1761, a power connector 1762 and at least one electrical receptacle 1766. Additionally, the cooling device 1354 can be disposed mounted on the detection unit 1310 in the present embodiment.

In the present embodiment, the power connector 1762 can be implemented using a power plug such as an alternating-current (AC) male plug, and each of the at least one electrical receptacle 1766 can be implemented as an AC female outlet which is similar to an AC split outlet. In some embodiments, the power connector 1762 can be plugged into a wall outlet. In some embodiments, the power connector 1762 can be plugged into an electrical receptacle of a power strip which is plugged into a wall outlet. When an electronic device is connected to one of the at least one electrical receptacle 1766 and placed within the detection area DA, the thermal detection system 1700 can be configured to monitor a thermal condition of the electronic device. For example, when the electronic device exhibits a temperature abnormality, the user can be notified via a visible signal or, an audible signal transmitted in a wired or wireless manner through a communication unit such as the communication unit 1640 shown in FIG. 16. As another example, when the electronic device exhibits a temperature abnormality, power supplied from the power connector 1762 to the at least one electrical receptacle 1766 can be actively cut off. As a result, all electronic devices plugged into the at least one electrical receptacle 1766 are powered off to achieve a safety power delivery scheme. As those skilled in the art can appreciate the operation of the thermal detection system 1700 after reading the above paragraphs directed to FIG. 1 to FIG. 16, further description is omitted here for brevity.

Figure 18:
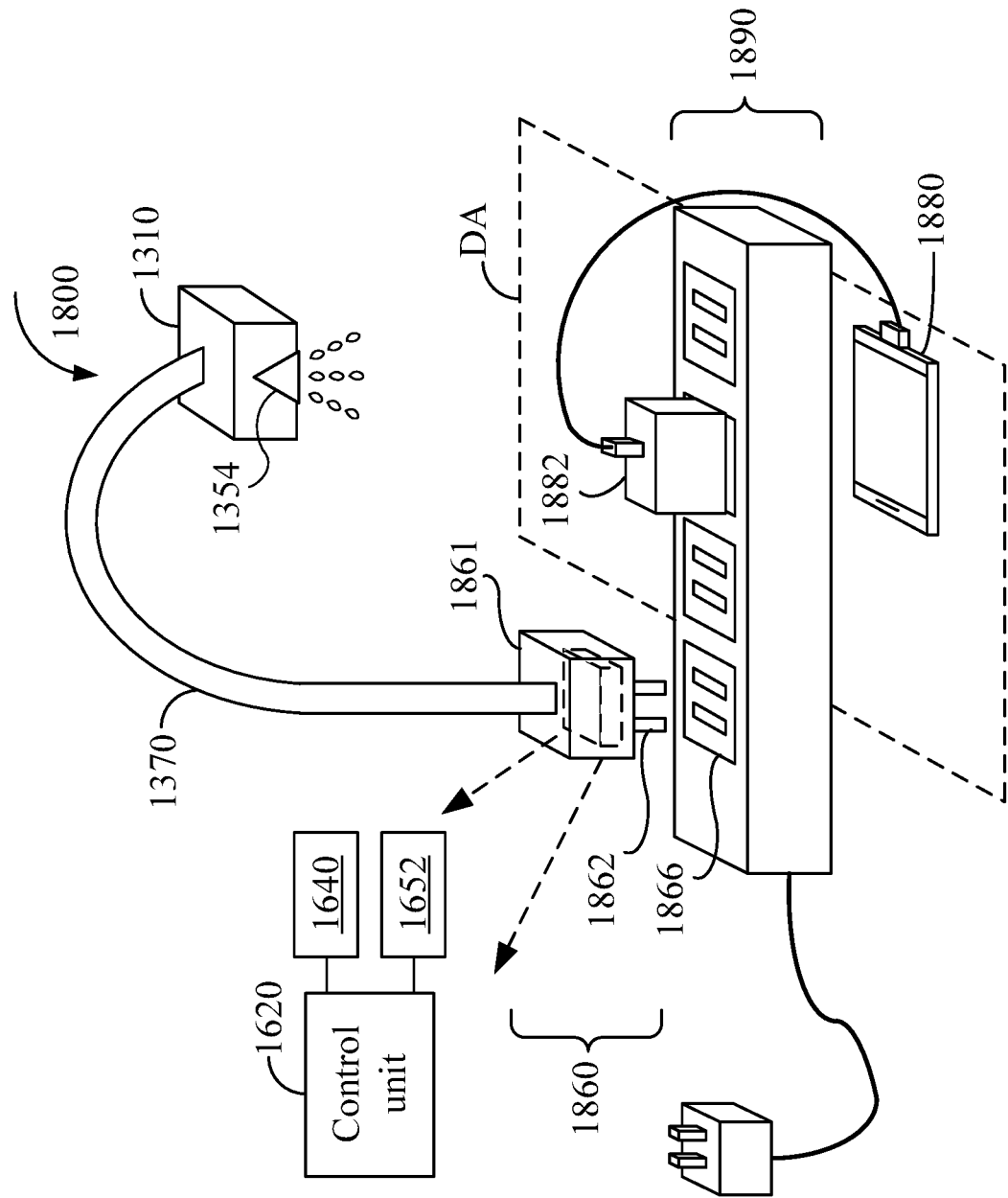
FIG. 18 illustrates an implementation of the thermal detection system shown in FIG. 1 in accordance with some embodiments of the present disclosure.

FIG. 18 illustrates an implementation of the thermal detection system 100 shown in FIG. 1 in accordance with some embodiments of the present disclosure. The structure of the thermal detection system 1800 is similar/identical to the structure of the thermal detection system 1600 shown in FIG. 16 except that the base structure 1860 is implemented to include a power adapter, which includes a casing 1861 and a power connector 1862. Additionally, the cooling device 1354 can be disposed mounted on the detection unit 1310. In the present embodiment, the power connector 1862 can be implemented using a power plug such as an AC male plug. The power connector 1862 can be plugged into a wall outlet or an electrical receptacle of a power strip to thereby monitor a thermal condition of an electronic device placed within the detection area DA, The thermal detection system 1800 and the electronic device share a same power source.

In the present embodiment, the power connector 1862 and a charger 1882 are plugged into different electrical receptacles 1866 of a power strip 1890, wherein the charger 1882 is configured to charge an electronic device 1880 placed at a location within the detection area DA. The power connector 1862 may draw a first current from the power strip 1890, and the electronic device 1880 may draw a second current from the power strip 1890. The power strip 1890 is configured to cut off power supplied to the electronic device 1880 when a total current drawn from the power strip 1890 exceeds a threshold current. When the electronic device 1880 exhibits a temperature abnormality, the user can be notified via a visible signal or an audible signal transmitted in a wired or wireless manner through the communication unit 1640. Additionally or alternatively, when the electronic device 1880 exhibits a temperature abnormality, large load currents can be actively generated to trigger overload protection of the power strip 1890. For example, the protection circuit 1652 is coupled to the control unit 1620 and the power connector 1862. When the thermal detection result DR indicates that a temperature at the location is equal to or greater than a threshold value, the protection circuit 1652 can increase the first current so as to increase the total current drawn from the power strip 1890 to exceed the threshold current. As a result, the power strip 1890 may trigger overload protection to cut off the power supplied to the electronic device 1880. As those skilled in the art can appreciate the operation of the thermal detection system 1800 after reading the above paragraphs directed to FIG. 1 to FIG. 17, further description is omitted here for brevity.

Figure 19:
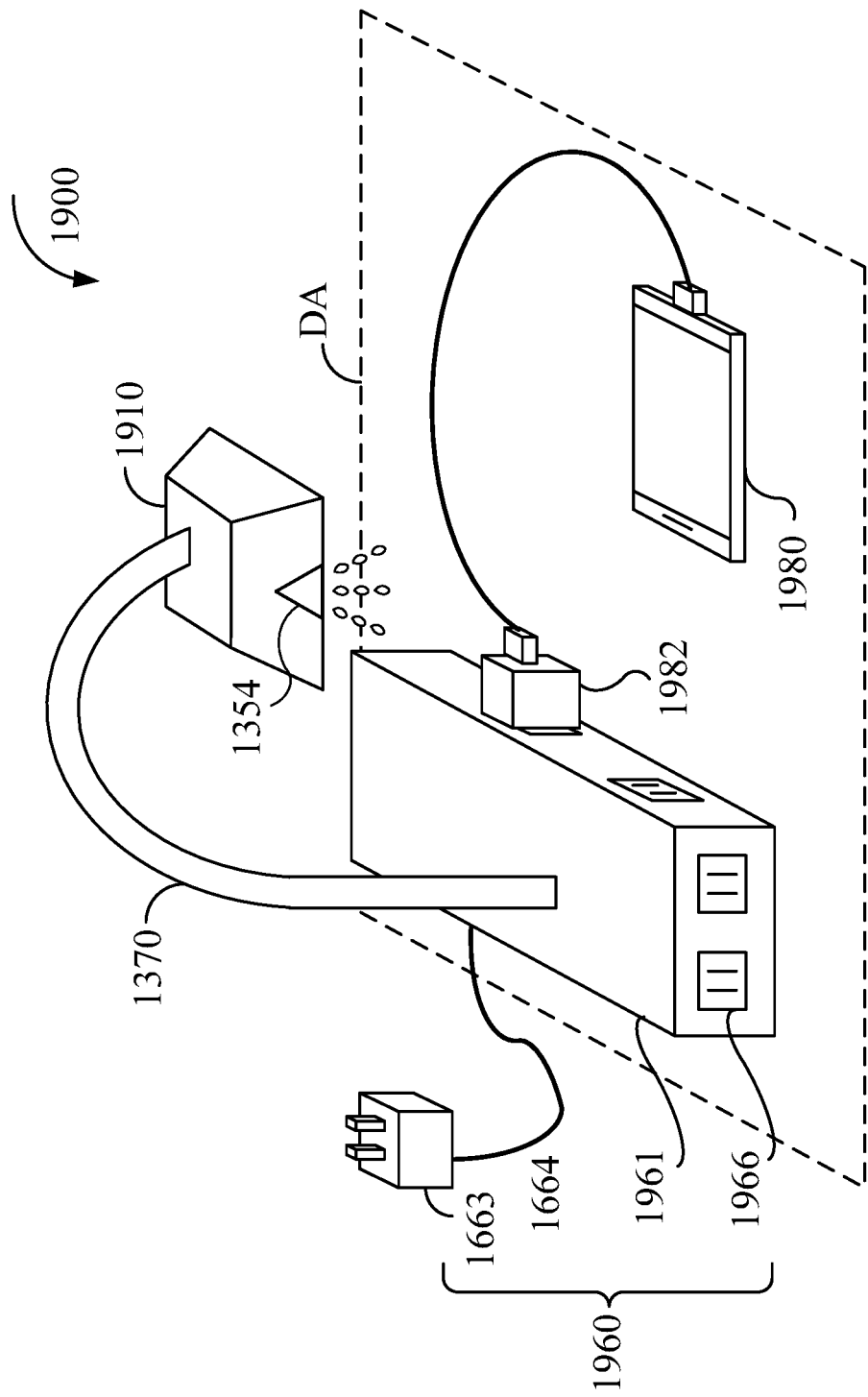
FIG. 19 illustrates an implementation of the thermal detection system shown in FIG. 1 in accordance with some embodiments of the present disclosure.

FIG. 19 illustrates an implementation of the thermal detection system 100 shown in FIG. 1 in accordance with some embodiments of the present disclosure. The structure of the thermal detection system 1900 is similar/identical to the structure of the thermal detection system 1600 shown in FIG. 16 except that the base structure 1960 is implemented as a different power strip, which includes a plurality of electrical receptacles 1966 disposed on one or more sides of a casing 1961. Additionally, the cooling device 1354 can be disposed mounted on the detection unit 1310 in the present embodiment. It is worth noting that the detection unit 1910 can be used as a lamp such as desk lamp, a table lamp or a reading lamp. By way of example but not limitation, the detection unit 1910 can include an optical area indicating unit, such as the area indicating unit 916 shown in FIG. 9, to function as a lamp assembly for providing illumination. A human-perceptible area provided by the optical area indicating unit can serve as an illumination area of the lamp assembly.

In addition to an illumination function, the thermal detection system 1900 can provide temperature monitoring and protection functions. For example, the thermal detection system 1900 can be configured to monitor a thermal condition of an electronic device 1980 located within the detection area DA, wherein the electronic device 1980 is charged by a charger 1982 plugged into one of the electrical receptacles 1966. As a result, the thermal detection system 1900 can provide a safe reading area, e.g. equal to or substantially equal to the detection area DA. It is worth noting that when the illumination function is disabled, the thermal detection system 1900 still can monitor the thermal condition of the electronic device 1980.

For example, when the electronic device 1980 exhibits a temperature abnormality, the user can be notified via a visible signal or an audible signal transmitted in a wired or wireless manner through a communication unit such as the communication unit 1640 shown in FIG. 16. As another example, when the electronic device 1980 exhibits a temperature abnormality, power supplied from the base structure 1960 can be cut off. As a result, all electronic devices plugged into the electrical receptacles 1966 are powered off to achieve a safety power delivery scheme. As still another example, when the electronic device 1980 exhibits a temperature abnormality, the cooling device 1354 can be configured to reduce a temperature at one or more locations within the detection area DA. As those skilled in the art can appreciate the operation of the thermal detection system 1900 after reading the above paragraphs directed to FIG. 1 to FIG. 18, further description is omitted here for brevity.

Figure 20:
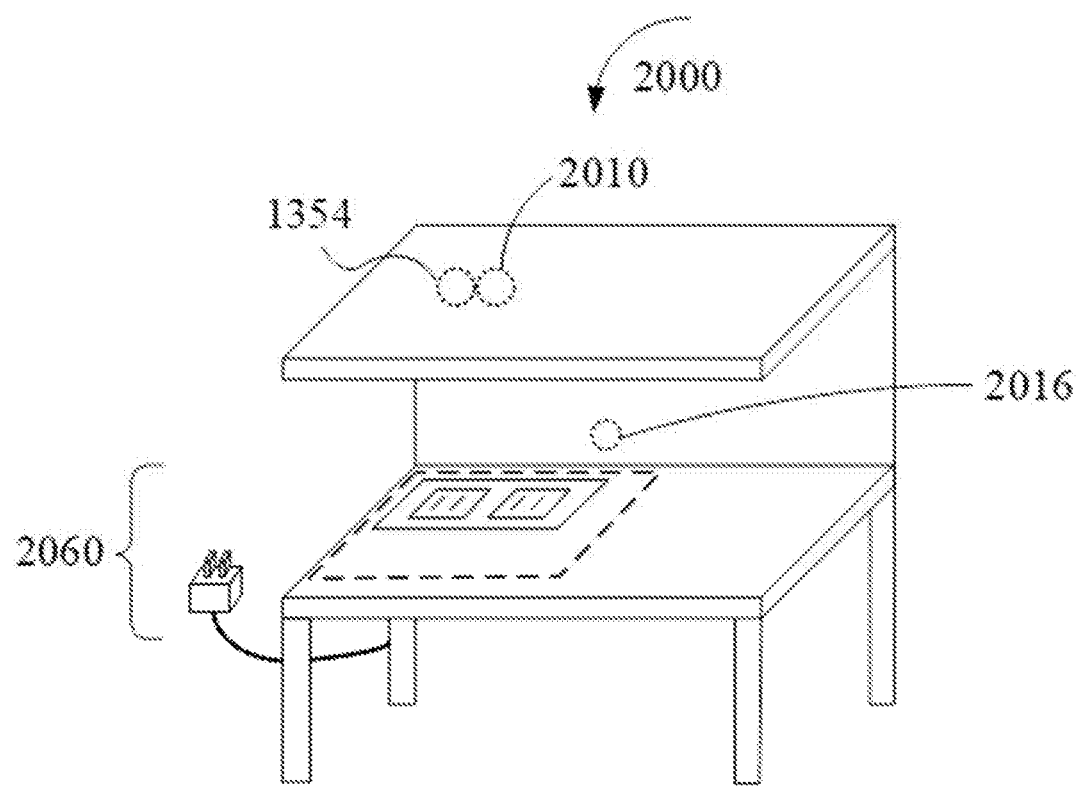
FIG. 20 illustrates an implementation of the thermal detection system shown in FIG. 1 in accordance with some embodiments of the present disclosure.

FIG. 20 illustrates an implementation of the thermal detection system 100 shown in FIG. 1 in accordance with some embodiments of the present disclosure. The thermal detection system 2000 can be implemented as a piece of furniture, i.e. a desk in the present embodiment, capable of monitoring a thermal condition therearound. The thermal detection system 2000 includes, but is not limited to, a detection unit 2010, a sound generator 2016 and a power strip 2060. The detection unit 2010 can represent an embodiment of the detection unit 130 shown in FIG. 1. For example, the detection unit 2010 can be implemented by at least one of the detection units described above. The sound generator 2016 can represent at least a portion of an embodiment of the area indicating unit 116 shown in FIG. 1. For example, the sound generator 2016 can be implemented by the sound generator 816 shown in FIG. 8. The power strip 2060 can be implemented by at least one of the power strips described above. In some embodiments, the power strip 2060 can be replaced with other types of power connectors such as the power adapters. It is worth noting that, in some embodiments, at least one of the control unit 120, the notification unit 130, the communication unit 140 and the protection unit 150 shown in FIG. 1 can be installed within the desk shown in FIG. 20. For example, the thermal detection system 2000 may further include the cooling device 1354 shown in FIG. 13, which serves as an embodiment of the protection unit 150 shown in FIG. 1 and can be installed within the desk shown in FIG. 20.

In the present embodiment, a portion of the power strip 2060 can be embedded into the desk. For example, a portion of the power strip 2060 can be wrapped with furniture materials, thus achieving an aesthetic appearance. As those skilled in the art can appreciate a safety power delivery scheme and associated operation employed by the thermal detection system 2000 after reading the above paragraphs directed to FIG. 1 to FIG. 19, further description is omitted here for brevity.

It is worth noting that other related products can utilize the proposed thermal detection system to achieve thermal condition monitoring and/or power failure protection all fall within the scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A thermal detection system, comprising:
a thermal detector, comprising a thermal sensor array, the thermal detector being configured to detect thermal radiation within a detection area around the thermal detector, the detection area being defined by a field of view of the thermal sensor array;
an area indicating unit, arranged to indicate a human-perceptible area according to the detection area, wherein the human-perceptible area comprises a visible area; the visible area is located within the detection area and indicates a geometric form of the detection area; and a control unit, coupled to the thermal detector and the area indicating unit, the control unit being configured to generate a thermal detection result according to the detected thermal radiation;

wherein the detection area is located on a reference surface below the thermal detector;

the thermal detection system further comprises:

a base structure, fixed relative to the reference surface;

an arm structure, connected between the base structure and the thermal detector, wherein the arm structure is flexible to allow relative movement between the thermal detector and the reference surface to adjust the detection area; and a notification unit, coupled to the control unit, the notification unit being configured to generate a notification signal according to the thermal detection result so as to indicate an overheating condition;

wherein the control unit comprises:

a memory, configured to store the thermal detection result; and a processing circuit, coupled to the notification unit and the memory, wherein when the thermal detection result indicates that a temperature at a first location on the detection area is greater than or equal to a first threshold value, or indicates that a rate of change of the temperature at the first location is greater than or equal to a second threshold value, the processing circuit is configured to determine if an object is passing over the first location according to the thermal detection result stored in the memory; when the processing circuit determines that the object is passing over the first location, the notification unit is configured to generate the notification signal to indicate that the overheating condition occurred at the first location.

2. The thermal detection system of claim 1, wherein the detection area is located on a reference surface; the area indicating unit comprises:

a light emitting device, controlled by the control unit, the light emitting device being configured to emit a light signal; and a light guiding structure, configured to guide the light signal toward the reference surface to form the visible area on the reference surface.

3. The thermal detection system of claim 1, further comprising:

a power connector, connected to a power strip to draw a first current from the power strip, wherein the object, which is an electronic device, is placed at a second location within the detection area, and connected to the power strip to draws a second current from the power strip; the power strip is configured to cut off power supplied to the electronic device when a total current drawn from the power strip exceeds a threshold current; and a protection circuit, coupled to the control unit and the power connector, wherein when the thermal detection result indicates that the temperature at the second location is equal to or greater than the first threshold value, or indicates that a rate of change of the temperature at the second location is equal to or greater than the second threshold value, a temperature abnormality occurs at the second location, and the protection circuit is configured to increase the first current so as to increase the total current to exceed the threshold current.

4. The thermal detection system of claim 1, wherein the area indicating unit comprises:

a sound generator, wherein when the object is passing through or located within the detection area, the sound generator is configured to generate a sound signal;

when the object is located outside the detection area, the sound generator is configured to stop generating the sound signal.

5. The thermal detection system of claim 1, further comprising at least one of a protection circuit and a cooling device;

wherein the protection circuit is configured to, when the thermal detection result indicates that a temperature at a second location within the detection area is equal to or greater than a third threshold value, cut off power supplied to an electronic device placed at the second location;

wherein the cooling device is configured to, when the thermal detection result indicates that a temperature at a third location within the detection area is equal to or greater than a fourth threshold value, reduce the temperature at the third location.

6. The thermal detection system of claim 1, wherein the area indicating unit comprises:

a collapsible boundary structure, arranged to indicate a boundary of the visible area of the human-perceptible area, wherein when the thermal detector is activated, the collapsible boundary structure is stretched out to be located on a boundary of the detection area.

7. The thermal detection system of claim 1, further comprising:

a communication unit, coupled to the notification unit, the communication unit being configured to send out the notification signal in a wired or wireless manner.

8. A thermal detection system, comprising:

a thermal detector, comprising a thermal sensor array, the thermal detector being configured to detect thermal radiation within a detection area around the thermal detector, the detection area being defined by a field of view of the thermal sensor array;

an area indicating unit, arranged to indicate a human-perceptible area according to the detection area, wherein the human-perceptible area comprises a visible area; the visible area is located within the detection area and indicates a geometric form of the detection area;

a control unit, coupled to the thermal detector and the area indicating unit, the control unit being configured to generate a thermal detection result according to the detected thermal radiation;

an arm structure, wherein one end of the arm structure is connected to the thermal detector; and a power strip, comprising a casing and at least one electrical receptacle disposed on a portion of an outer surface of the casing, another end of the arm structure being disposed on another portion of the outer surface of the casing, wherein the power strip is configured to supply power to at least one electronic device located within the detection area through the at least one electrical receptacle.

9. The thermal detection system of claim 8, further comprising at least one of a notification unit, a protection circuit and a cooling device;

wherein the notification unit is configured to generate a notification signal according to the thermal detection result so as to indicate an overheating condition;

wherein the protection circuit is configured to, when the thermal detection result indicates that a temperature at a first location within the detection area is equal to or greater than a first threshold value, cut off power supplied to an electronic device placed at the first location;

wherein the cooling device is configured to, when the thermal detection result indicates that a temperature at a second location within the detection area is equal to or greater than a second threshold value, reduce the temperature at the second location.

10. The thermal detection system of claim 9, wherein the notification unit is included in the thermal detection system, and is coupled to the control unit; the thermal detection result indicates a temperature at a third location on the detection area is greater than or equal to a third threshold value; and the control unit comprises:
a memory, configured to store the thermal detection result; and
a processing circuit, coupled to the notification unit and the memory, the processing circuit being configured to determine if the electronic device is passing over the third location according to the thermal detection result stored in the memory, wherein when the processing circuit determines that the object is passing over the third location, the notification unit is configured to generate the notification signal to indicate that the overheating condition occurred at the third location.

11. The thermal detection system of claim 9, wherein the notification unit is included in the thermal detection system, and is coupled to the control unit; the thermal detection system further comprises:
a communication unit, coupled to the notification unit, the communication unit being configured to send out the notification signal in a wired or wireless manner.

12. The thermal detection system of claim 8, wherein the detection area is located on a reference surface; the area indicating unit comprises:
a light emitting device, controlled by the control unit, the light emitting device being configured to emit a light signal; and
a light guiding structure, configured to guide the light signal toward the reference surface to form the visible area on the reference surface.

13. The thermal detection system of claim 8, wherein the area indicating unit comprises one of a sound generator and a collapsible boundary structure;
wherein the sound generator is configured to, when the thermal detection result indicates that a temperature at a boundary of the detection area reaches a first threshold value, or indicates that a rate of change of the temperature at the boundary of the detection area reaches a second threshold value within a predetermined period of time, generate a sound signal to indicate that the electronic device is passing through a boundary of an audible area of the human-perceptible area;
wherein the collapsible boundary structure is arranged to indicate a boundary of the visible area of the human-perceptible area; when the thermal detector is activated, the collapsible boundary structure is stretched out to be located on a boundary of the detection area.

14. The thermal detection system of claim 8, further comprising:

a power connector, connected to the power strip to draw a first current from the power strip, wherein an electronic device is placed at a location within the detection area, and connected to the power strip to draws a second current from the power strip;
the power strip is configured to cut off power supplied to the electronic device when a total current drawn from the power strip exceeds a threshold current; and
a protection circuit, coupled to the control unit and the power connector, wherein when the thermal detection result indicates that the temperature at the location is equal to or greater than a threshold value, the protection circuit is configured to increase the first current so as to increase the total current to exceed the threshold current.

15. A thermal detection system for an electronic device, the thermal detection system comprising:
a thermal detector, comprising a thermal sensor array, the thermal detector being configured to detect thermal radiation within a detection area around the thermal detector, the detection area being defined by a field of view of the thermal sensor array;
an area indicating unit, arranged to indicate a human-perceptible area according to the detection area, wherein the human-perceptible area comprises a visible area; the visible area is located within the detection area and indicates a geometric form of the detection area;
a control unit, coupled to the thermal detector and the area indicating unit, the control unit being configured to generate a thermal detection result according to the detected thermal radiation;
a protection circuit, coupled to the control unit, wherein when the thermal detection result indicates that a temperature at a location within the detection area is equal to or greater than a threshold value, the protection circuit is configured to cut off power supplied to the electronic device placed at the location;
an electrical receptacle, coupled to the electronic device; and
a power connector, selectively coupled to the electrical receptacle, the power connector being configured to supply the power, wherein when the thermal detection result indicates that the temperature at the location is less than the threshold value, the protection circuit is configured to couple the power connector to the electrical receptacle such that the power supplied by the power connector is delivered to the electronic device; when the thermal detection result indicates that the temperature at the location is greater than or equal to the threshold value, the protection circuit is configured to uncouple the power connector from the electrical receptacle.

16. The thermal detection system of claim 15, wherein the detection area is located on a reference surface; the area indicating unit comprises:
a light emitting device, controlled by the control unit, the light emitting device being configured to emit a light signal; and
a light guiding structure, configured to guide the light signal toward the reference surface to form the visible area on the reference surface.

17. The thermal detection system of claim 15, wherein the area indicating unit comprises one of a sound generator and a collapsible boundary structure;
wherein the sound generator is configured to, when the thermal detection result indicates that a temperature at a boundary of the detection area reaches a first threshold value, or indicates that a rate of change of the temperature at the boundary of the detection area reaches a second threshold value within a predetermined period of time, generate a sound signal to indicate that the electronic device is passing through a boundary of an audible area of the human-perceptible area;

wherein the collapsible boundary structure is arranged to indicate a boundary of the visible area of the human-perceptible area; when the thermal detector is activated, the collapsible boundary structure is stretched out to be located on a boundary of the detection area.

18. The thermal detection system of claim 15, further comprising at least one of a notification unit, a protection circuit and a cooling device;

wherein the notification unit is configured to generate a notification signal according to the thermal detection result so as to indicate an overheating condition;

wherein the protection circuit is configured to, when the thermal detection result indicates that a temperature at a first location within the detection area is equal to or greater than a first threshold value, cut off power supplied to the electronic device placed at the first location;

wherein the cooling device is configured to, when the thermal detection result indicates that a temperature at a second location within the detection area is equal to or greater than a second threshold value, reduce the temperature at the second location.

19. The thermal detection system of claim 18, the notification unit is included in the thermal detection system, and is coupled to the control unit; the thermal detection result indicates a temperature at a third location on the detection area is greater than or equal to a third threshold value; and the control unit comprises:

a memory, configured to store the thermal detection result; and a processing circuit, coupled to the notification unit and the memory, the processing circuit being configured to determine if the electronic device is passing over the third location according to the thermal detection result stored in the memory, wherein when the processing circuit determines that the object is passing over the third location, the notification unit is configured to generate the notification signal to indicate that the overheating condition occurred at the third location.

20. The thermal detection system of claim 18, further comprising:

a communication unit, coupled to the notification unit, the communication unit being configured to send out the notification signal in a wired or wireless manner.

* * * * *